United States Patent
Allibhai et al.

(10) Patent No.: US 12,087,329 B1
(45) Date of Patent: *Sep. 10, 2024

(54) TEXT-DRIVEN EDITOR FOR AUDIO AND VIDEO EDITING

(71) Applicant: Meta Platforms Technologies, LLC, Menlo Park, CA (US)

(72) Inventors: Shamir Allibhai, San Francisco, CA (US); Roderick Neil Hodgson, Worcester Park (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,502

(22) Filed: Feb. 10, 2023

Related U.S. Application Data

(63) Continuation of application No. 17/378,742, filed on Jul. 18, 2021, now Pat. No. 11,626,139.

(Continued)

(51) Int. Cl.
*G11B 27/031* (2006.01)
*G06F 3/04842* (2022.01)
(Continued)

(52) U.S. Cl.
CPC ........ *G11B 27/031* (2013.01); *G06F 3/04842* (2013.01); *G06F 3/04847* (2013.01);
(Continued)

(58) Field of Classification Search
CPC ..... G11B 27/036; G11B 27/034; G11B 27/34; G11B 27/36; G06F 3/04847; G06F 3/0486; G10L 15/26; H04N 21/8456
See application file for complete search history.

(56) References Cited

U.S. PATENT DOCUMENTS 7,298,930 B1  11/2007  Erol et al.
7,870,488 B2   1/2011  Kirkpatrick
(Continued)

OTHER PUBLICATIONS

International Preliminary Report on Patentability for International Application No. PCT/US2021/056872 mailed May 11, 2023, 7 pages.

(Continued)

*Primary Examiner* — Girumsew Wendmagegn
(74) *Attorney, Agent, or Firm* — Greenberg Traurig, LLP

(57) ABSTRACT

The disclosed technology is a system and computer-implemented method for assembling and editing a video program from spoken words or soundbites. The disclosed technology imports source audio/video clips and any of multiple formats. Spoken audio is transcribed into searchable text. The text transcript is synchronized to the video track by timecode markers. Each spoken word corresponds to a timecode marker, which in turn corresponds to a video frame or frames. Using word processing operations and text editing functions, a user selects video segments by selecting corresponding transcribed text segments. By selecting text and arranging that text, a corresponding video program is assembled. The selected video segments are assembled on a timeline display in any chosen order by the user. The sequence of video segments may be reordered and edited, as desired, to produce a finished video program for export.

20 Claims, 22 Drawing Sheets

Related U.S. Application Data

(60) Provisional application No. 63/106,648, filed on Oct. 28, 2020, provisional application No. 63/106,649, filed on Oct. 28, 2020.

(51) Int. Cl.
| | |
|---|---|
| *G06F 3/04847* | (2022.01) |
| *G06F 16/955* | (2019.01) |
| *G06F 40/166* | (2020.01) |
| *G06V 20/40* | (2022.01) |
| *G10L 15/26* | (2006.01) |
| *G10L 17/06* | (2013.01) |
| *G10L 21/055* | (2013.01) |
| *G10L 21/10* | (2013.01) |
| *G10L 25/57* | (2013.01) |
| *G11B 27/034* | (2006.01) |
| *G11B 27/036* | (2006.01) |
| *G11B 27/34* | (2006.01) |
| *G11B 27/36* | (2006.01) |
| *H04N 21/845* | (2011.01) |
| *G06F 3/0486* | (2013.01) |

(52) U.S. Cl.
CPC ........ *G06F 16/9566* (2019.01); *G06F 40/166* (2020.01); *G06V 20/46* (2022.01); *G06V 20/49* (2022.01); *G10L 15/26* (2013.01); *G10L 17/06* (2013.01); *G10L 21/055* (2013.01); *G10L 21/10* (2013.01); *G10L 25/57* (2013.01); *G11B 27/034* (2013.01); *G11B 27/036* (2013.01); *G11B 27/34* (2013.01); *G11B 27/36* (2013.01); *H04N 21/8456* (2013.01); *G06F 3/0486* (2013.01)

(56) References Cited

U.S. PATENT DOCUMENTS

| | | |
|---|---|---|
| 10,129,573 B1 | 11/2018 | Sahasrabudhe et al. |
| 10,945,040 B1 | 3/2021 | Bedi et al. |
| 11,508,411 B2 | 11/2022 | Allibhai et al. |
| 2001/0047266 A1 | 11/2001 | Fasciano |
| 2002/0069073 A1 | 6/2002 | Fasciano |
| 2006/0206526 A1 | 9/2006 | Sitomer |
| 2007/0050406 A1 | 3/2007 | Byers |
| 2007/0050837 A1 | 3/2007 | Lopez-Estrada |
| 2007/0061728 A1 | 3/2007 | Sitomer et al. |
| 2011/0060751 A1* | 3/2011 | English ................. G06F 16/438 707/758 |
| 2011/0202848 A1 | 8/2011 | Ismalon |
| 2011/0239107 A1 | 9/2011 | Phillips et al. |
| 2011/0239119 A1 | 9/2011 | Phillips et al. |
| 2012/0210221 A1 | 8/2012 | Khan et al. |
| 2013/0007043 A1 | 1/2013 | Phillips et al. |
| 2013/0047059 A1 | 2/2013 | Phillips et al. |
| 2013/0124984 A1 | 5/2013 | Kuspa |
| 2013/0294746 A1 | 11/2013 | Oz et al. |
| 2014/0169767 A1* | 6/2014 | Goldberg ............... G06Q 10/10 386/282 |
| 2015/0378998 A1 | 12/2015 | Houh et al. |
| 2017/0220568 A1 | 8/2017 | Dombrowski et al. |
| 2019/0051301 A1 | 2/2019 | Locascio et al. |
| 2020/0126559 A1 | 4/2020 | Ochshorn et al. |
| 2020/0126561 A1 | 4/2020 | Kofman et al. |
| 2020/0126583 A1 | 4/2020 | Pokharel et al. |
| 2020/0143820 A1 | 5/2020 | Donofrio et al. |
| 2020/0273493 A1* | 8/2020 | Huber .................... G11B 27/34 |
| 2021/0076105 A1 | 3/2021 | Parmar et al. |
| 2021/0256968 A1 | 8/2021 | Winsor |
| 2022/0076706 A1 | 3/2022 | Walker et al. |
| 2022/0130422 A1 | 4/2022 | Allibhai et al. |
| 2022/0130423 A1 | 4/2022 | Allibhai et al. |
| 2022/0130427 A1 | 4/2022 | Allibhai et al. |

OTHER PUBLICATIONS

International Preliminary Report on Patentability for International Application No. PCT/US2021/056876, mailed May 11, 2023, 7 pages.

International Search Report and Written Opinion for International Application No. PCT/US2021/056872 mailed Feb. 23, 2022, 8 pages.

International Search Report and Written Opinion for International Application No. PCT/US2021/056876, mailed Feb. 23, 2022, 8 pages.

\* cited by examiner

FIG. 6

```
112    {
113      "startTime": "00:00:02,040",
114      "endTime": "00:00:02,070",
115      "value": "I"
116    },
117    {
118      "startTime": "00:00:02,070",
119      "endTime": "00:00:02,220",
120      "value": "think"
121    },
122    {
123      "startTime": "00:00:02,220",    ← 710
124      "endTime": "00:00:02,360",      ← 720
125      "value": "there's"              ← 730
126    },
127    {
128      "startTime": "00:00:02,370",
129      "endTime": "00:00:02,430",
130      "value": "a"
131    },
132    {
133      "startTime": "00:00:02,430",
134      "endTime": "00:00:02,760",
135      "value": "general"
136    },
```

TEXT-DRIVEN EDITOR FOR AUDIO AND VIDEO EDITING

PRIORITY APPLICATIONS

This application is a Continuation of Ser. No. 17/378,742, filed Jul. 18, 2021 which claims the benefit of U.S. Provisional Application 63/106,648, titled "TEXT-DRIVEN EDITOR FOR AUDIO AND VIDEO ASSEMBLY", filed Oct. 28, 2020 and U.S. Provisional Application 63/106,649, titled "TEXT-DRIVEN EDITOR FOR AUDIO AND VIDEO EDITING", filed Oct. 28, 2020. The priority provisional applications are incorporated by reference herein in their entirety.

CROSS-REFERENCE TO ANOTHER APPLICATION

This application is related to concurrently filed U.S. patent application Ser. No. 17/378,740 (now U.S. Pat. No. 11,508,411) filed Jul. 18, 2021 for "Text-Driven Editor for Audio and Video Assembly." The related application is incorporated by reference herein in its entirety.

FIELD OF THE TECHNOLOGY DISCLOSED

The disclosed technology generally relates to a computer-implemented methods, systems, and computer programs for video editing and assembling a video program. More particularly, the present invention relates to a method, system, and computer program for editing and assembling a video program based on keywords or sound bites derived from the transcribed speech in the audio tracks of video clips.

BACKGROUND

The subject matter discussed in the section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claim technology.

Video editing is the process of editing segments of video footage, video clips, special effects, and sound recordings into a finalized video program. In the past, nonlinear video editing (NLE) has been performed on complex and expensive dedicated machines with dedicated software, but over time video editing software has evolved to be widely available for use on personal computers and an even computer tablets and smart phones. The need for video editing software has grown over the last decade as more social media video platforms have become widely available incorporating video. The exponential growth of social media video platforms have resulted in a corresponding growth in content creators who are generating video content, editing that video content, and uploading the video content to the social media video platforms and elsewhere.

In professional video editing, the computer programs are expensive and complex, requiring that the user be trained in the use of a generally complex user interface. To become adept, users of nonlinear video editing must acquire an expert level of knowledge and training to master the processes and user interfaces for nonlinear video editing systems. Known nonlinear video editing systems can be intimidating for the general user because of the complexity.

There is a need for a simplified method of video editing and method for assembling a video program which is user-friendly and intuitive to a novice user. The present technology simplifies the creation of a video program by using a text-based user interface. The audio track in a video file is transcribed into text representing the speakers' voices in the audio track. In a manner similar to word processing program, user selects and sequences the transcribed text, and video frames corresponding to the text are assembled into a video program. The present technology is highly intuitive and provides an improved user interface and user experience (UX).

INCORPORATIONS

The following materials are incorporated by reference as if fully set forth herein:

U.S. Provisional Patent Application No. 62/666,017, entitled "Machine Learning-Based Speech-To-Text Transcription Cloud Intermediary," filed on May 2, 2022.

U.S. Provisional Patent Application No. 62/666,025, entitled "Deep Learning Based Speech-To-Text Transcription Cloud Intermediary," filed on May 2, 2022.

U.S. Provisional Patent Application No. 62/666,050, entitled "Expert Deep Neural Networks for Speech-To-Text Transcription," filed on May 2, 2022.

A. van den Oord, S. Dieleman, H. Zen, K. Simonyan, O. Vinyals, A Graves, N. Kalchbrenner, A Senior, and K. Kavukcuoglu, "Wavenet: A Generative Model for Raw Audio," arXiv:l609.03499, 2016;

S. b. Arik, M. Chrzanowski, A Coates, G. Diamos, A Gibiansky, Y. Kang, X. Li, J. Miller, A Ng, J. Raiman, S. Sengupta and M. Shoeybi, "Deep Voice: Real-Time Neural Text-To-Speech," arXiv:l702.07825, 2017.

J. Wu, "Introduction To Convolutional Neural Networks," Nanjing University, 2017.

I. J. Goodfellow, D. Warde-Farley, M. Mirza, A Courville, and Y. Bengio, "Convolutional Networks," Deep Learning, MIT Press, 2016.

F. Chaubard, R. Mundra, and R. Socher, "CS 224D: Deep Learning For NLP, Lecture Notes: Part I," 2015.

F. Chaubard, R. Mundra, and R. Socher, "CS 224D: Deep Learning For NLP, Lecture Notes: Part II," 2015.

F. Chaubard, R. Mundra, and R. Socher, "CS 224D: Deep Learning For NLP, Lecture Notes: Part III," 2015.

F. Chaubard, R. Mundra, and R. Socher, "CS 224D: Deep Learning For NLP, Lecture Notes: Part IV," 2015.

F. Chaubard, R. Mundra, and R. Socher, "CS 224D: Deep Learning For NLP, Lecture Notes: Part V," 2015; and Y. Fan, M. Potok, and C. Shroba, "Deep Learning For Audio," 2017.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

In the drawings, like reference characters generally refer to like parts throughout the different views. Also, the drawings are not necessarily to scale, with an emphasis instead generally being placed upon illustrating the principles of the technology disclosed.

FIG. 6 illustrates the transcript map created for the text transcription of an audio track.

FIG. 7 illustrates the time code synchronization of individual words which have been transcribed from the audio track.

FIGS. 12A and 12B illustrate, for the screen shown in FIG. 11, the corresponding transcript maps showing the start timecode, the end timecode, and the word values text for the starting word and ending word in the selection.

FIG. 19 further illustrates using callbacks to play reordered video segments among the first, second, and third video segments upon completion of playback of a current video segment.

DETAILED DESCRIPTION

System Overview

Figure 1:
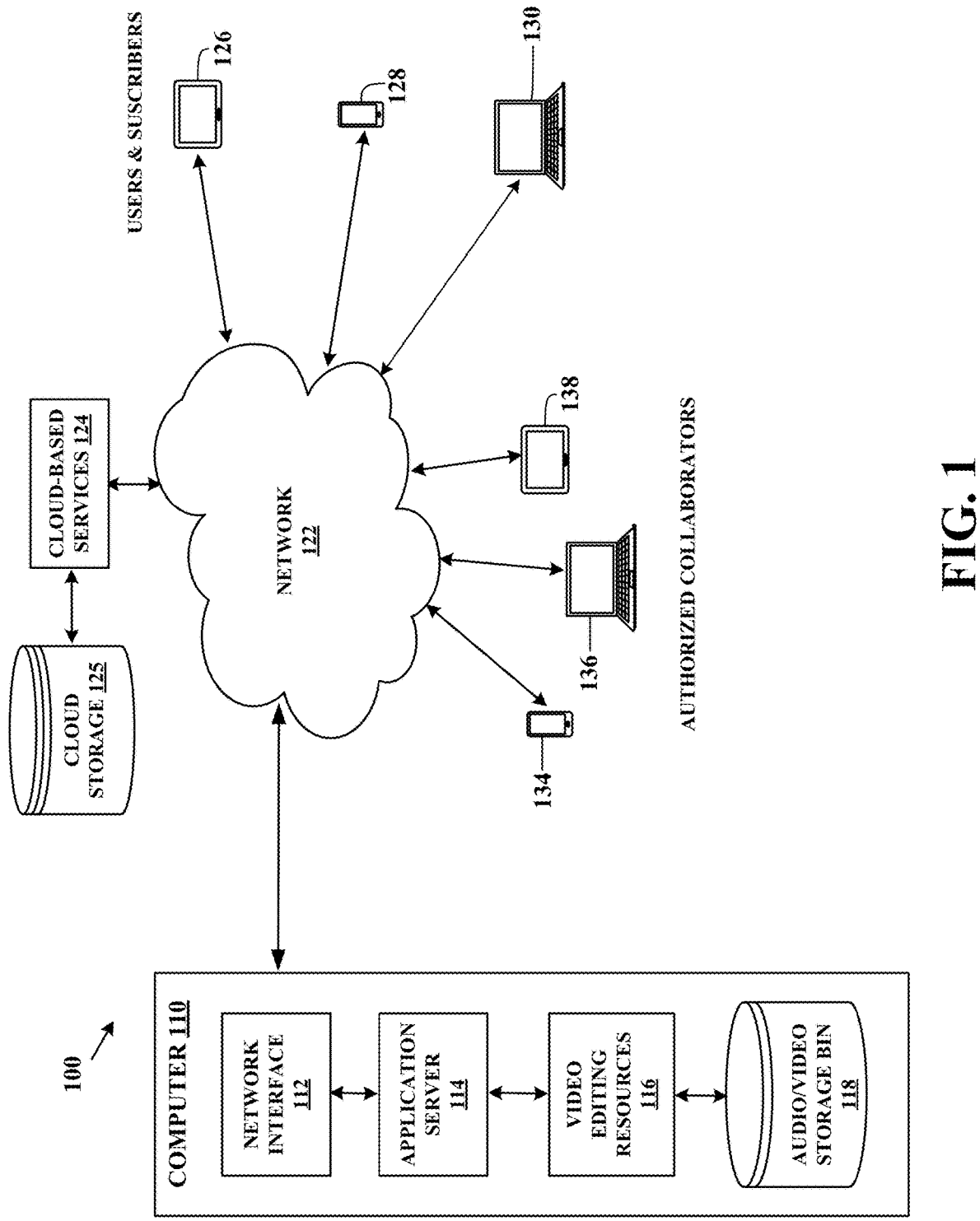
FIG. 1 is an architectural level schematic showing a system for editing and assembling a video program using transcribed text or soundbites.

The present technology allows a user to edit and assemble a video program from transcribed text. In one aspect, the present technology is implemented as a browser-based or web-based application which includes cybersecurity features. The remote user uploads video files or video clips to an application server. An application server imports the video files or video clips to a storage device. For the purposes of this disclosure, video files or video clips generally include a file containing a synchronized audio track and a video track, along with metadata of various kinds including frame rate, image resolution, and timecode. The audio track and video track a synchronized by timecode. Each frame of audio is synchronized with each frame of video each frame with the same timecode or timestamp.

The video track includes a sequence of images where each image is a frame operating at a known frame rate. Video clip also includes an audio track which carries the audio for sounds represented in each frame of video. Customarily, the audio track will include the vocal speech of a person or persons shown in the video track. The sounds in the video track are synchronized to the images in the audio track. A video file normally consists of a container containing video data in a video coding format alongside audio data in an audio coding format. The container can also contain synchronization information and various metadata.

In one embodiment, the disclosed technology is a browser-based transaction system. The user pays a fee for using the host editing and video assembly facilities, with the cost based on the duration of the audio video editing session or other metrics. Or, the host editing facilities may be provided on a subscription basis.

The technology has the capability of assembling a new video program. The features include video program editing, annotating, collaborating and then exporting to Microsoft Word, subtitles, Adobe Premier, Final Cut Pro, Avid Media Composer, and other nonlinear editing applications (NLE) and related applications for providing effects, captioning, titling, etc.

A user interacts with the first and second panels of the user interface by selecting text from a transcript of a selected resource in the first panel, dragging and dropping it onto the second panel, which causes the application to create a new clip. The order of clips can be arranged by the user by dragging and dropping clips.

The editing and assembling of a video program proceeds in phases. In the first phase, uploading and transcription, video files are uploaded from the user's device to the website and stored in application's video storage, much like the video storage bin a nonlinear editing system. The audio track is extracted and undergoes a speech-to-text transcription, converting spoken voices in the audio track into transcribed speech in the form of formatted text, which is editable and searchable. A lengthy audio track can be transcribed efficiently in a short time. The transcribed text is displayed in the text window on the user's video device. When multiple speakers are involved, the software is capable of automatically assigning speaker identification headings to the various speakers.

The user has the capability of editing the text and adding comments and annotations to the transcription. The video is accurately synchronized to the text representation using timecode. Every text word has an associated timecode, and every video frame has a timecode synchronized to the text words.

In the next phase, the transcribed text is displayed in a text window in the user interface, alongside a video window that displays the video corresponding to the text display. If the cursor is moved to a particular point in the text display, highlighting a particular word, the corresponding video frame is displayed. If several words or sentences are highlighted in the text display, the corresponding video may be played in a video window. The text may be searched, as in a conventional word processor, and text selections may be highlighted. The highlighted text selections or text segments may be moved to a video timeline portion of the display. The video timeline shows the selected text along with the thumbnail icon of the first preview frame of the corresponding video segment.

In one aspect, the disclosed technology is a text-based video editor using spoken informational content. The system provides asynchronous transcription of the audio track in a video clip. The video editing process begins after the initial step of transcribing and editing the text from the audio track. A timecode is associated with every spoken word. Segments of speech are identified by in-and-out timecodes. The transcribed text can be word-searched to locate soundbites, which are used in the assembly of a video program. The video assembly editor is based on text-based editing and assembly. The disclosed technology generally uses short video segments for quick and easy program assembly. Segments can originate all originate from the same media or video file or combination. A preview video can assembled and exported for post-processing to a finishing nonlinear editor such as Avid media composer, Adobe Premier, or Final Cut Pro to produce a fine cut video program.

Transcription of Audio Track Into Text

The speech-to-text transcription disclosed may be based on machine learning or deep machine learning algorithms that select a speech recognition engine from multiple available recognition engines for accurately transcribing an audio channel based on sound and speech characteristics of the audio channel. A method and system of this type is disclosed in U.S. patent application Ser. No. 16/373,503, which is hereby incorporated by reference in its entirety for all purposes. The technology disclosed and the incorporated application relates to a machine learning based speech-to-text transcription method and system that selects one or more speech transcription engines from multiple available speech recognition engines to provide the most accurate transcription of speech from an audio channel based on sound and speech characteristics. Any other speech-to-text transcription programs may be used, as long as they provide an output of high quality and high accuracy text from the video track in a video clip.

Video Editing Workflow

The most accepted method of video editing workflow is the creation of a rough-cut followed by a fine-cut. In the creation of an audio/video project, leading to a final program, it is the accepted process to first create a version of the video that shows the main features fit together in a sort of global view. This is called a rough-cut. In rough-cut form, collaborators may comment on the video, offering suggestions for improvement. It is much easier to work with a rough-cut, which can often be assembled in minutes and in a form wherein changes can easily be made. Once all the major components are laid out in a viable form, the video editing work flow proceeds to the next stage in the process, which can be thought of as fine-tuning, which would include performing transitions, adding visual effects, sound editing, inclusion of captions—anything that brings the video project closer to its final form. The disclosed technology supports this workflow by providing text-based video program assembly. The making of a rough-cut video has typically been a collaborative effort, which involved the cutting out printed transcript and having teams re-order the cut transcript on a whiteboard. The present technology streamlines this process using the video editing workflow described herein.

Assembling a Video Program with Multiple Speakers

One application of the present technology is the assembly of a video program in which multiple persons are interviewed about a specific subject, and the individuals present their views on camera. Often times, in answer to an interviewer's questions, the interviewees present viewpoints on the multiple topics. The problem of the video program editor is to bring together a coherent video program, in which the subjects discussed are organized by topic. This requires editing the video program to show comments on the same topic, before moving on to a different topic.

With conventional video editors, this is a very complicated operation in video cutting and video assembly, where the user must digitally clip small video segments and move them around. The user makes individual decisions about where to clip the video segments and organize those segments that will make up the final program. This can be an unwieldy process with a conventional video editing system, even to produce a rough-cut which can later be refined. Basically, if there are three or more speakers commenting on multiple subjects, the video will need to be clipped and sequenced multiple times in order to make a coherent program.

With the present technology, the desired result is easily achieved. After the transcription phase, where the voices of the different speakers are transcribed into text form, the speakers' names may be automatically applied labeled to assist in searching and locating relevant text and content.

Word processing methods may then be used on the transcribed text to locate relevant content pertaining to a particular question posed. The editor may select the relevant content for each of the multiple speakers in this will be stored in a video content bin. With the disclosed technology, the video assembly editor may be used to easily create a visual timeline that shows the spoken words of each speaker in a chosen sequence. The individual soundbites may be arranged in a simple manner on the timeline to assemble a rough-cut of the video program. The program can be previewed and also be previewed by authorized collaborators, who may provide comments and suggestions after viewing the rough-cut video program.

Automatic Tagging Of Speakers' Voices

In one aspect of the present technology, the system provides tagging of speaker's names. The program detects features associated with the speaker's name to provide labels in the transcribed text that identify a speaker by the attributes of the speaker's voice. Using these speaker labels, the text transcription may be searched, for transcribed text that is associated with a particular speaker. One advantage of this feature allows all the video segments associated with a particular speaker to be grouped together by the corresponding video timecodes to assemble a rough video program comprising video segments associated with a single speaker. For example, in an interview, it may be advantageous to bring together, all the comments made by a particular speaker in one series of concatenated video segments without including the segments associated with the interviewer. This is a very fast way of assembling the rough-cut of only those video segments associated with a specific interviewee.

System Architecture

The following describes in architectural form implementations for a browser-based video editing and video assembly method and system 100, which is intentionally simplified to improve clarity in the description. FIG. 1 shows the interconnection of the various major elements. The use of these elements will be described in greater detail further on in connection with the discussion of the structure and use of those elements.

FIG. 1 includes a system 100 including a host computer 110 for the browser based application. User endpoints may include devices such as desktop and laptop computers 130, smart phones 128, and computer tablets 126, which provide access to a network 122 to interact with data stored on a cloud-based store 124 and network access to host a computer 110. A user's video files may be stored locally in the user's remote device 126,128,130 or in cloud storage 125 accessible through a cloud-based service 124 or locally to the user. Video files may be retrieved from cloud storage 125 and uploaded to the host computer 100 and video editing application 114. The video application is resident in the application server 114. The application server 114 has access to video editing resources 116 and also to audio/video storage bin 122, which stores the user's uploaded files.

Additionally, remote computers, tablets, and smart phones may have access through the network 122 to the application 114 as authorized collaborators. As part of the video editing and video assembly method, users 134, 136, 138 may be specified as reviewers and authorized to provide comments or editing suggestions to the finalized video program, as will be described. The authorized collaborators may review the video and comment in virtual real-time, so that the commentary may be received by the user while the video program is being finalized.

Cloud-based services 124 and cloud-based storage 125 provide the end users with a convenient method of storing video files, which may be uploaded to computer 110, and in particular to audio/video storage bin 122, to provide the raw video clips which will be used for the assembly of a finished video program.

The interconnection of the elements of system 100 will now be described. The network 122 couples the computers 130, smart phones 128, and the computer tablets 126 with each other.

The communication path can be point-to-point over public and/or private networks. The communication can occur over a variety of networks, including private networks, VPN, MPLS circuit, or Internet, and can use appropriate application programming interfaces (APIs) and data interchange formats such as Representational State Transfer (REST), JavaScript Object Notation (JSON), Extensible Markup Language (XML), Simple Object Access Protocol (SOAP), Java Message Service (JMS), and/or Java Platform Module System.

Communications may be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX.

The system components of FIG. 1 are implemented by software running on varying types of computing devices. For example, a workstation, server, a computer cluster, a blade server, or a server farm. Additionally, a variety of authorization and authentication techniques, such as username/password, Open Authorization (OAuth), Kerberos, SecureID, digital certificates and more, can be used to secure the communications.

The cloud-based services 124 provide functionality to users that are implemented in the cloud or on the Internet. The cloud-based services 124 can include Internet hosted services such as news web sites, blogs, video streaming web sites, social media web sites, hosted services, cloud applications, cloud stores, cloud collaboration and messaging platforms, and/or cloud customer relationship management (CRM) platforms. Cloud-based services 124 can be accessed using a browser (via a URL) or a native application (a sync client).

Categories of cloud-based services 124 include software-as-a-service (SaaS) offerings, platform-as-a-service (PaaS) offerings, and infrastructure-as-a-service (IaaS) offerings.

Examples of common web services today include YouTube™, Facebook™, Twitter™, Google™, LinkedIn™, Wikipedia™, Yahoo™, Baidu™, Amazon™, MSN™, Pinterest™, Taobao™, Instagram™, Tumblr™, eBay™, Hotmail™, Reddit™, IMDb™, Netflix™, PayPal™, Imgur™, Snapchat™, Yammer™, Skype™, Slack™, HipChat™, Confluence™, TeamDrive™, Taskworld™, Chatter™, Zoho™, ProsperWorks™, Google's Gmail™, Salesforce.com™, Box™, Dropbox™, Google Apps™, Amazon AWS™, Microsoft Office 365™, Workday™, Oracle on Demand™, Taleo™, Jive™, and Concur™.

In a browser-based system 100 such as disclosed, network security features may be provided to provide network security, including encryption. Security features may be provided by encryption or other means to provide security. In a corporate organization, users may access hundreds of providers of cloud-based services to generate, store, collaborate, and share data with other users inside or outside of the organization. The network interface includes security protocols to protect the user's data and prevent infiltration of malware into the video editing system.

Figure 2:
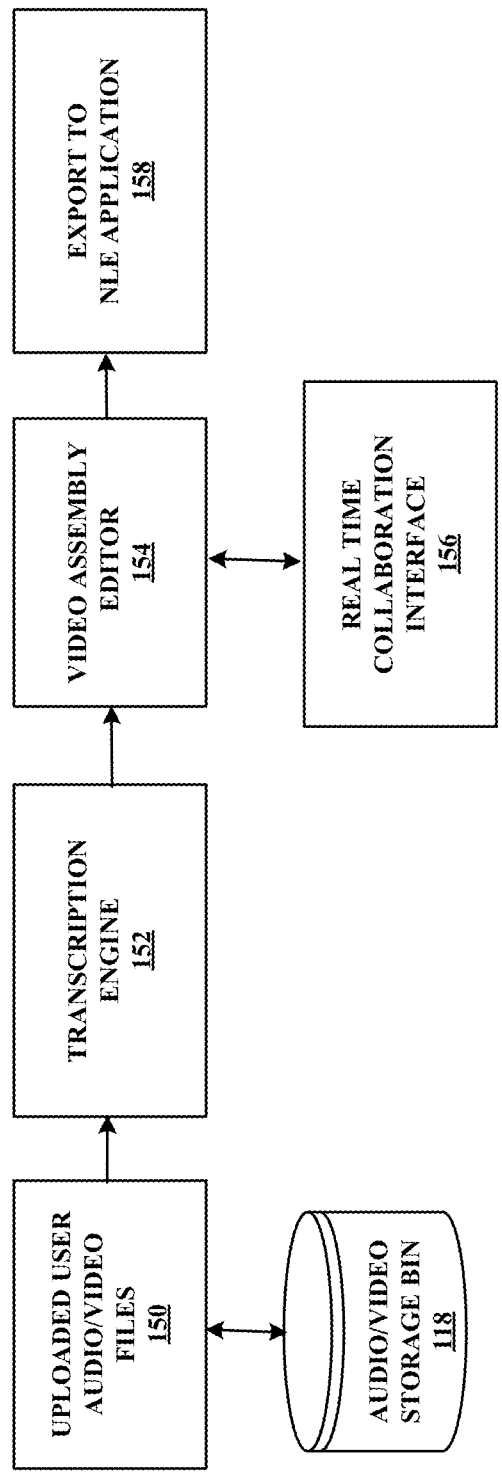
FIG. 2 illustrates the generalized workflow of the disclosed technology for a system for assembling a video program using transcribed text or soundbites.
Figure 3:
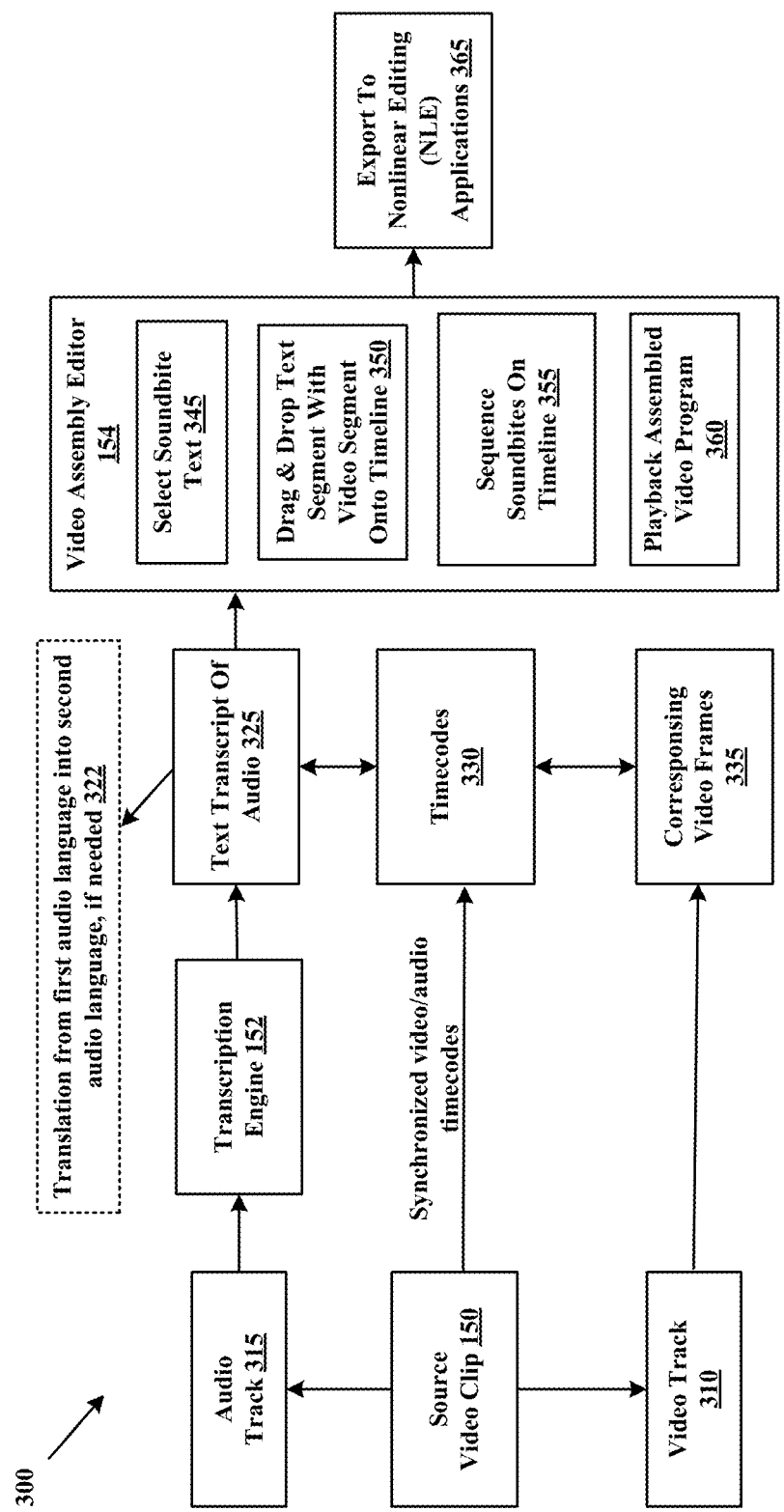
FIG. 3 illustrates the workflow of the disclosed technology in greater detail.

FIG. 2 illustrates the generalized workflow of the disclosed technology for a system for assembling a video program using transcribed video soundbites, and FIG. 3 illustrates the workflow in more detail.

In FIG. 2, a user's audio/video files 150 are uploaded from the user's remote device 126, 128, 130 or from a cloud-based video store 125 associated with a cloud-based service 124. The uploaded files are stored in an audio/video storage bin 122. A transcription engine 152 transcribes the audio track associated with the video clip to provide an accurate text transcription of the audio track synchronized to the audio and video track via timecode.

The transcription engine 152 may be operated independently of the editing and assembly module as a separate service, to provide accurate transcriptions of audio content, such as video interviews, on a pay-as-you-go or subscription basis.

When a new editing and assembly project is initiated, the user's transcribed text files are transferred into the application's video assembly editor 154, where a finished video program is assembled. The video assembly editor 154 is a graphical user interface and a set of user tools for creating a video program from the user's uploaded video files 150. The disclosed technology uses the transcribed text to select to select and sequence video segments into an assembled video program. Using text transcriptions of the audio track, the user selects segments of text, and drags and drops onto a visual timeline in a chosen sequence. The video frames and audio frames associated with the selected text and moved to the timeline along with the text. The assembly editor 154 allows the user to experiment with different cuts and sequences to assembly of video program. The resultant video program may be a rough-cut video program in which various video segments are assembled in proper sequence. In this case, the user may export 158 the rough-cut video program to a secondary video editing system such as Avid media composer, Adobe Premier, Final Cut Pro, to provide finishing touches to the rough cut and arrive at a fine-cut version. In another embodiment, the uploading may occur directly from the application's video assembly editor and the transcription engine may be operated as component of the application's video assembly editor.

In some uses of the disclosed technology, the video assembly editor 154 will produce a completed video program, without the need for post-processing in a nonlinear editor.

The application provides a collaboration interface 156 for authorized collaborators to sign into the application, play the assembled video, and provide comments to the user while the video is being assembled. This may occur in virtual real-time, so that the comments will be received while the video is still being assembled by the user.

A video clip typically includes a plurality of sequential image frames and an audio track associated with the video clip, by time code, and other metadata, such as resolution and frame rate. The audio track typically includes a speaker or speakers' vocal track comprising spoken words and sentences.

As part of the first phase, the audio track is transcribed into text comprising a plurality of text segments, wherein the text segments map to a plurality of video segments. The audio frames and image frames per segment are always synchronized.

In FIG. 3, the process of assembling a video program is shown in more detail with reference to a single video clip 150 or video file. The source video clip 150 is selected by the user for processing by the system. The source clip 150 includes a video track 310 and the corresponding audio track 315. The video file also contains metadata in the form of frame rates, video formats, video resolutions, and time codes. Source video clips 150 may be in various video formats, with various frame rates and resolutions. For example, input video 150 may be one of several standard frame rates including: 24, 25, 30, 50, 60, 2398, 2997, 2997 DF, 5994, and 5994 DF and other known frame rates. In FIG. 3, synchronized video/audio time codes are maintained throughout the process of video assembly. The video clips 150 may be encoded in any popular format. An example would be MPEG-4 video clips, which is a popular form of lossy video compression encoding. The technology disclosed accommodates all popular video formats.

Each uploaded video clip 150 is stored in the user's video bin 122. The user may select one or more uploaded video clips 150 to be dragged and dropped into the video assembly editor 154 to create a new video program.

As illustrated in FIG. 3, the transcription engine 152 processes the audio track, providing a high quality audio-to-text transcription 325. Timecodes 330 are maintained throughout, so that the individual words in the text transcript will correspond to audio soundbites as well as corresponding video frames. Using this method, a timecode 330 is associated with each spoken word in the audio track 315. The text words may be edited, selected, copied, and moves as in a conventional word processing program. Selected text is always associated with corresponding audio and video by the timecodes 330.

Synchronized Timecodes

Timecode is a video synchronizing standard which is based on a 24-hour clock readout. Each frame of video assigned unique timecode value. The timecode 330 is a sequence of numeric codes generated at regular intervals by a timing synchronization system. Timecode is used in video production applications which require a temporal coordination of elements related to video frames and audio frames.

Basic time-code standards assume a video frame rate of 30 frames per-second or 25 frames per-second, depending on the country. The NTSC video standard used principally in the United States and some other countries has a frame rate of 30-frames per second (fps), and PAL and SECAM, used mostly in Europe, has a frame rate of 25-frames per second (fps). In NTSC, 30 frames equal one second. Video in color or DTV/HDTV actually has a frame rate in the US of 29.97 fps. Synchronization between 29.97 fps and 30 fps timecodes are maintained by methods such as periodically dropping timecode frames according to a formula, known as drop-frame timecode. Generally in the disclosed technology, drop frame timecode's are not used or required. In the present technology, additional frame rates may be used, including: 23.976, 59.97, 60, and other widely used frame rates.

Timecoding is also referred to as time stamping. One well-known type of timecode used in video production is SMPTE timecode. A SMPTE time code is used to identify a precise location on time-based media such as audio or video in digital systems. SMPTE refers to the standards organization Society of Motion Picture and Television Engineers.

The SMPTE standards actually describe a family of timecode encoding formats used in film, video, and audio production, including: Linear timecode (LTC), Vertical interval timecode (VITC), AES-EBU embedded timecode, Burnt-in timecode, CTL control track timecode (control track); and MIDI timecode.

Timecode is displayed in the format HH.MM.SS.FF (hours, minutes, seconds, frames). For example, if a video clip begins at timecode 14:34:01:22, this translates into 14 hours, 34 minutes, 1 seconds, 22 frames. In this way, each frame of a video track 310 and each frame of the corresponding audio track 315 includes a precise digital address.

In the technology disclosed, video assembly editor 154 tracks time code associated with each spoken word in the transcribed text abstracted from the audio track portion of the audio/video clip. A high quality transcription is performed on the audio track so that each individual speaker's audio is provided with the text transcription of the speech each speaker.

The transcription of a speaker's each spoken word is correlated to the audio track 315 timecode and the video track 310 timecode in the video track, such that the video corresponding to each spoken word is identifiable in the text transcript 325 of the audio video track. The transcribed audio text is presented in a text window in the user interface and may be searched as in a conventional word processing program such as Microsoft Word.

As described further on in more detail, a video program may be constructed by selecting words and phrases in text form from the transcribed audio speech in the text window. These selected soundbites may be arranged in a video program window. The video segment corresponding to the soundbites will be automatically selected and arranged on a timeline.

The video program is assembled in video assembly editor 154 essentially by moving around text transcribed from the audio track 315.

In the video assembly editor 154, the user selects soundbites or text segments 345 in a text display window, using conventional word processing editing functions. The user moves the chosen soundbite text 345 onto a visual timeline 350. The clips represented on the timeline 355 may be reordered, at least by a drag-and-drop method, and trimmed to assemble a video rough-cut which can be exported in any of a large number of video media formats such as including H.264 MPEG-4, the most popular format. The fine cut or formal cut can be performed on a dedicated nonlinear editing system such as Adobe Premiere Pro, Final Cut Pro X, SRT Subtitles, Avid Media Composer, DaVinci Resolve, Avid Pro Tools, and Adobe Audition.

The transcribed text and video are always locked in synchronization by the associated timecode 330. If the user moves the text pointer to a different location in the transcribed text 325, the corresponding video in the video window jumps to the new location.

Figure 4:
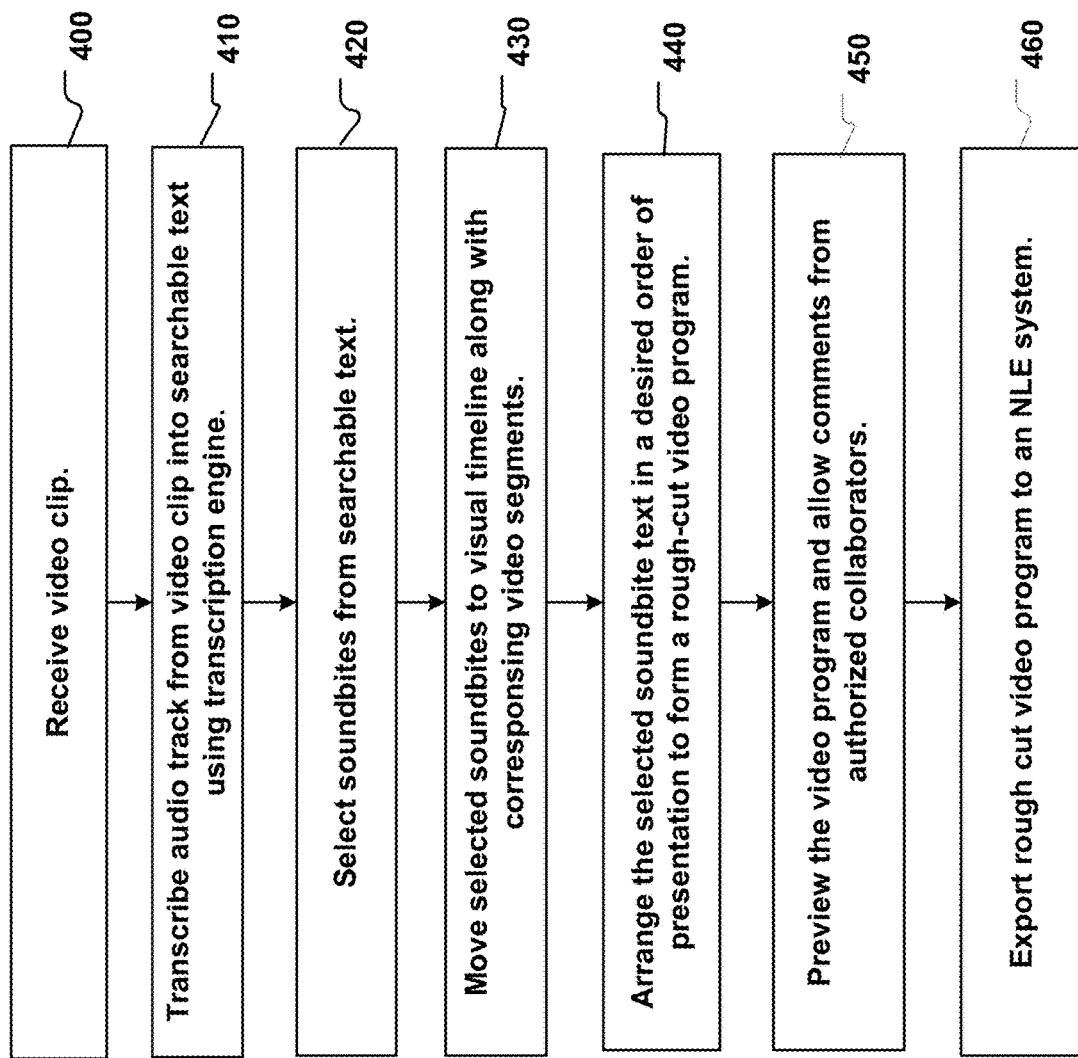
FIG. 4 is a flowchart illustrating the steps in assembling a video program from transcribed text or soundbites.

Continuing now to FIG. 4, according to several embodiments, a flowchart illustrates the steps for assembling a video program from user-provided video clips 150. In step 400, a video clip 150 or clips is received into the system as source material for creating and assembling a video program 360. In step 410, the audio track 315 for the clips 150 are transcribed using a transcription engine 152 to produce a high-quality searchable text transcript 325 of the audio track 315. In step 420, the user selects soundbites 345 from the searchable text displayed in the user interface display panel. In step 430, the user drags and drops selected soundbites onto a visual timeline 350. In step 440, the user arranges the selected soundbite text 345 in a desired presentation order to form an assembled video program 360. In step 450, the user previews the video program 360 and allows comments from authorized collaborators. In step 460, the assembled video program 360 is exported to a nonlinear editing system 365 for additional fine cut processing.

Figure 5:
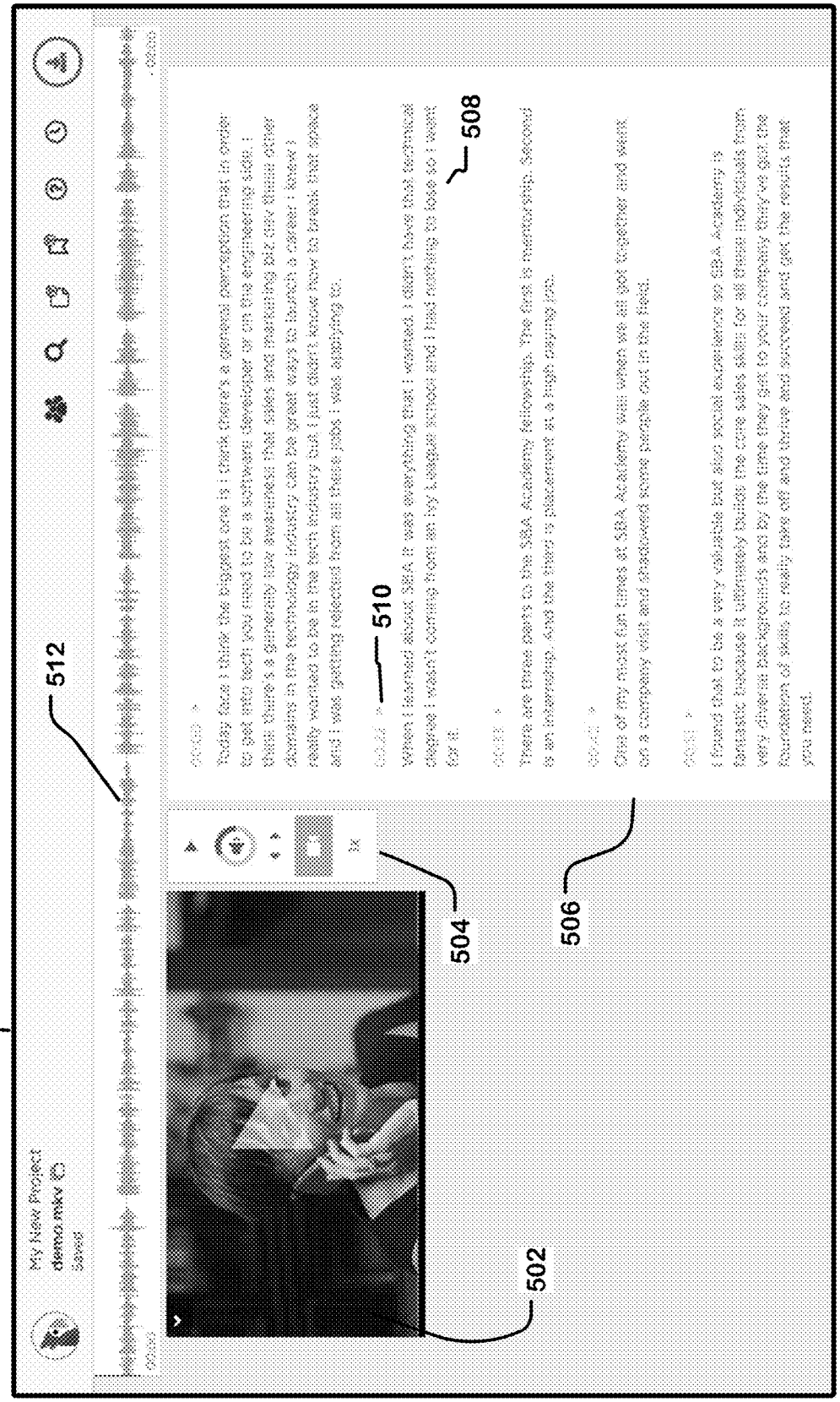
FIG. 5 illustrates the user interface of the disclosed technology, showing in particular the video window and the text window.

FIG. 5 shows a display screen of a graphical user interface 500 as viewed during the creation of a video project. In FIG. 5, transcription of a video clip 150 (FIG. 3) has already been performed and is presented in a text display panel 506. The video window 502 is shown, which displays video frames corresponding to the transcribed text. In this part of the user interface, the video window 502 includes playback controls 504 for controlling the playing of the video clip 150. In the text panel 506 to the right of the video window 502 the text corresponding to the video is displayed. The user interface screen shows that the video clip 150 may be played, the corresponding audio track 315 displayed, and the transcribed text 325 may be displayed. The video frames, the audio frames, and the elements in the text transcript are all synchronized by timecode.

The transcribed text 506 is structured by timecode. The spoken text is divided into text segments 508 or paragraphs, and each text segment is provided with visual timestamp 510 that indicates a time associated with each text segment 508. The time stamps (00:22) 510 are derived from the transcript map shown in FIG. 6 and FIG. 7, as will be described. The time stamps 510 provide a convenient way to locate specific text segments 508 in the transcription. For example, in a long video clip, the time stamps 510 provide a convenient way for searching through a lengthy transcript to locate specific content, along with the corresponding video 502 and the corresponding audio.

Also shown in the upper part of the display 500, the audio waveform 512 corresponding to the audio track 315 is shown. Any selected point in the audio waveform 512 will correspond to a text segment 508 and also to the corresponding video segment 502. The user may scroll through the audio waveform 512 waveform to select and play a particular segment of the audio track 315 for that video clip 150.

The Transcript Map

Figure 6:
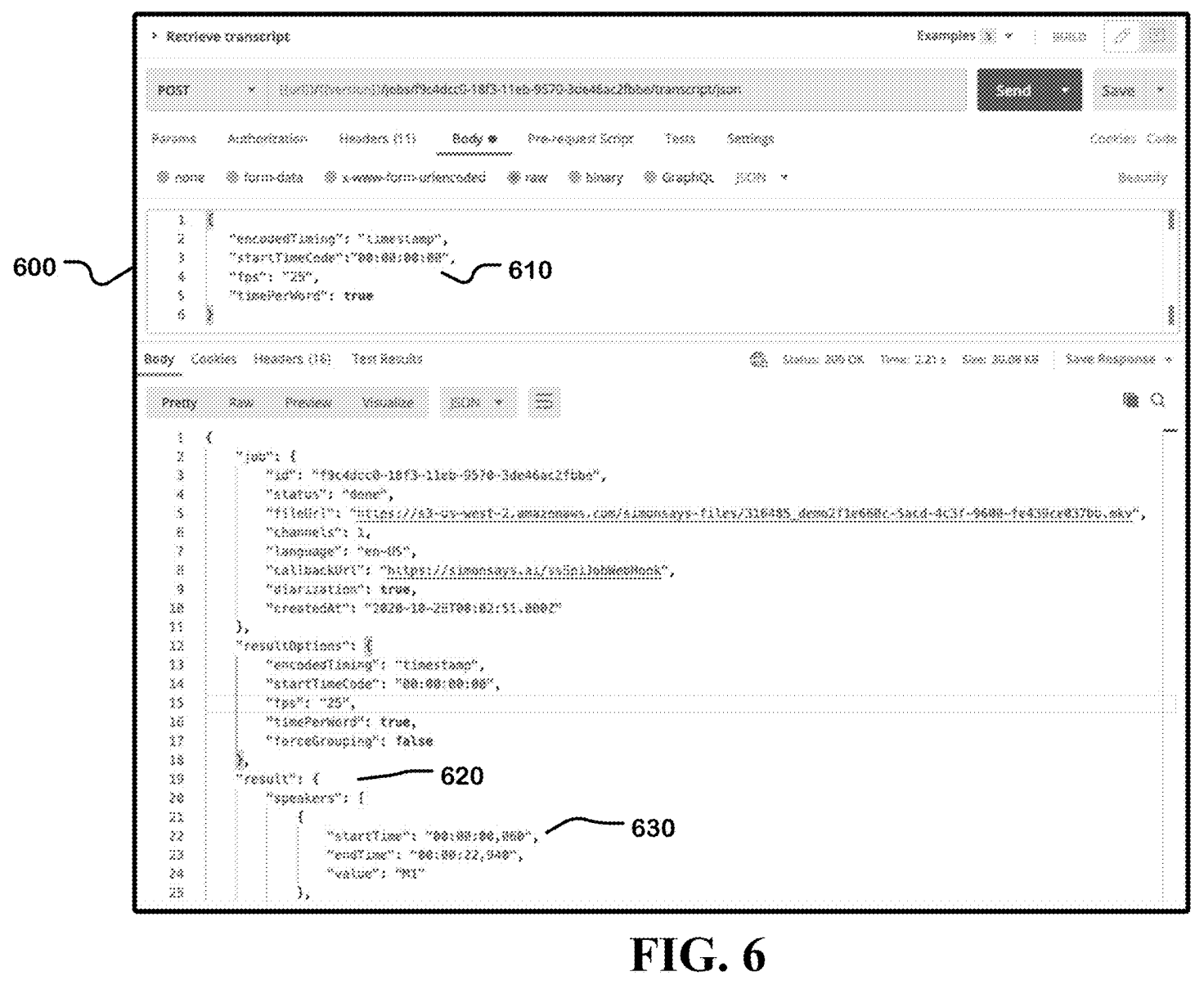

Turning now to FIG. 6, a transcript map 600 is created when the audio track 315 is transcribed into text. The transcript map 600 provides numerous identifiers for the transcribed text corresponding to a video clip 150. The transcript map includes file identification information. The transcript map 600 shows status information related to the video clip 150, the transcription language, the frame rate, the start timecode 610 and the end timecode 630 for that transcribed text segment 508. The transcript map 600 also identifies the first word in the text segment 508. In the case where there are multiple identified speakers, the transcript map identifies those speakers.

In FIG. 7, the transcript map 700 shows the breakdown of the start timecode 710, the end timecode 720 and the value for that timecode range, which is the text element associated with that timecode segment. FIG. 7 illustrates how the system associates every text element (individual word), with a timecode by start timecode 710 and end timecode 720. In this example, the text element "there's" corresponds to that timecode. Because timecode is associated with each text elements, rather than video frames, the timecode follows structure which is modified from traditional timecode structure, the final number having 999 divisions of time, rather than the conventional 30 frames per second.

In this illustration, the timecode tracks five spoken words in succession by the start timecode and the end timecode. The spoken word "I" is associated with the first text element. The spoken word "think" is associated with the second text element. The spoken word "there's" is associated with the third text element. The spoken word "a" is associated with the fourth text element. And the spoken word "general" is associated with the fifth text element. Together, the spoken phrase is "I think there is a general" in which each text element as a very specific start timecode and end timecode. The editing application tracks all of these individual text elements and the values of each text element. As is shown in FIG. 7 the timecode increments by an amount equal to the time required for text element to be spoken as a segment of the audio track 315. FIG. 7 is illustrative of how the application software logs individual word in the transcript. Selection of a particular word in the text display will bring the video to that point in the transcript and the associated video frames associated with that particular word in the text display will be queued up. In a similar manner, the audio waveform 512 corresponding to that particular text element will be shown in the display at the top of the user interface.

Video Assembly Editor

Figure 8:
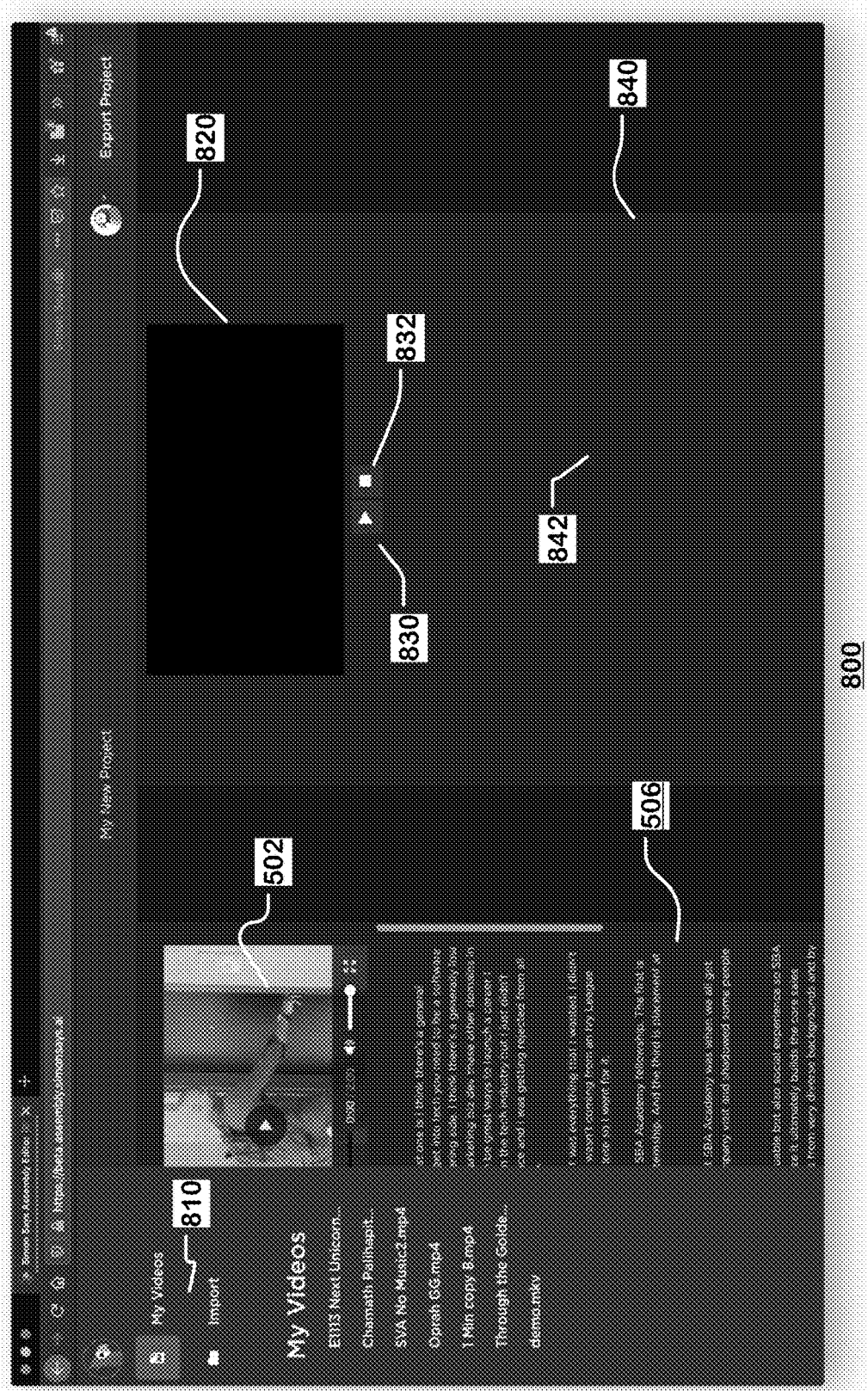
FIG. 8 illustrates the project creation screen of the disclosed technology application, including a list of videos clips from which the video program will be assembled.

FIG. 8 shows a video assembly interface 800 as used in the disclosed technology. In the leftmost panel, an import function 810 provides the user with the ability to import videos from various sources which may include cloud storage applications. Once the uploading of video clips is completed, for new project, the user may display a listing of imported video clips entitled "My Videos." These are all the imported video clips that are available for assembling the user's new video project. Also on the leftmost panel of the user interface, a video window 502 is displayed along with the text window 506 showing the transcribed text from the audio track 315. The video frames and transcribed text words are synchronized through timecode.

The rightmost panel in the user interface shows 800 the graphical elements that are used in the assembly of a new video program. A video window 820 is located in the topmost area of the display. The video window 820 includes play 830 and pause 832 controls. Below this video window is an open area 840 for the video timeline 842 as will be described. The video assembly timeline area 840 is the space where the selected soundbites and video preview thumbnails will be dragged-and-dropped and sequenced during the editing and assembly process.

Figure 9:
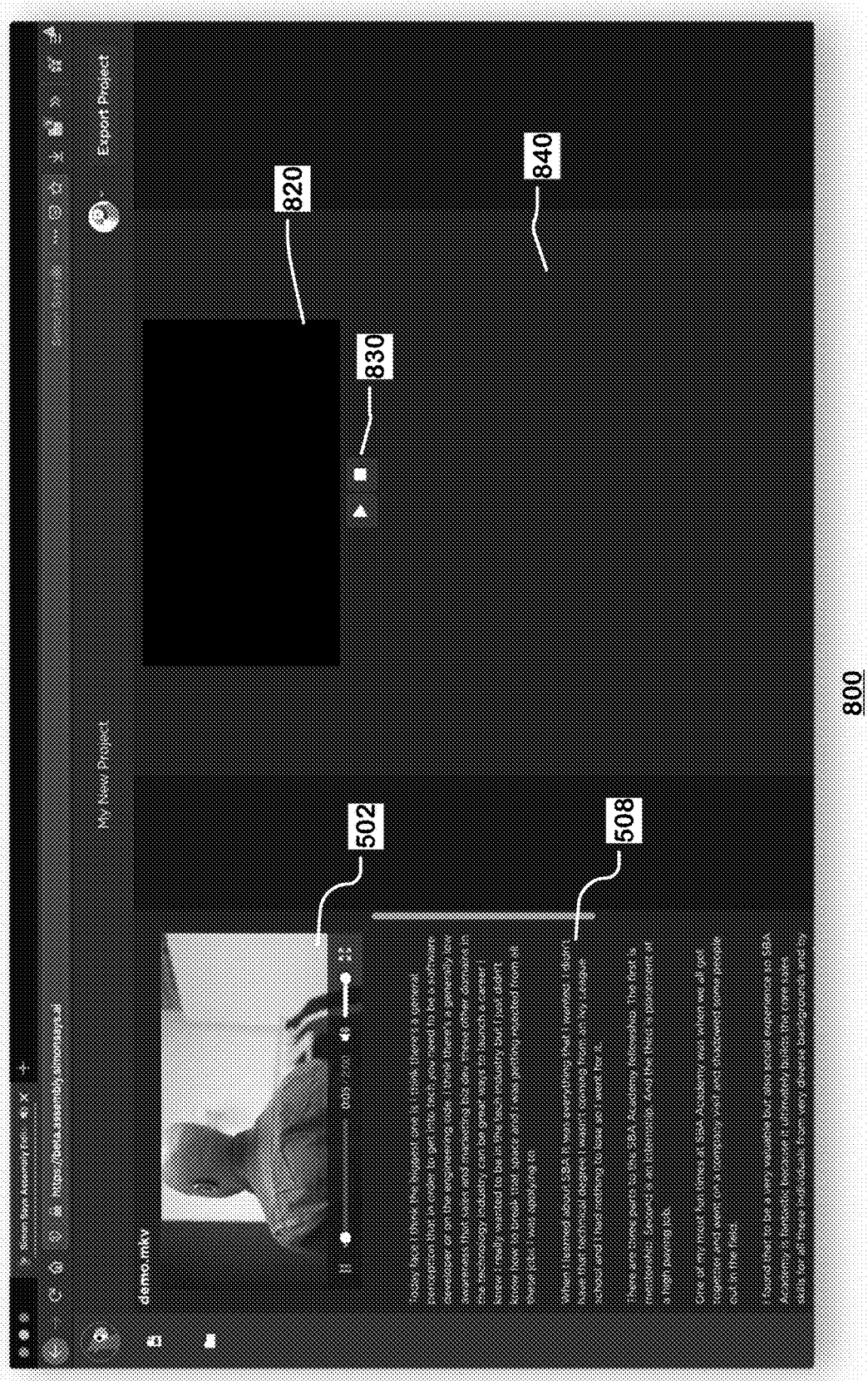
FIG. 9 illustrates the source video and corresponding source text used in the creation of a new project.

FIG. 9 shows a video assembly interface 800 as used in the disclosed technology. In this view, the leftmost panel does not show a listing of imported video clips entitled "My Videos."

Figure 10:
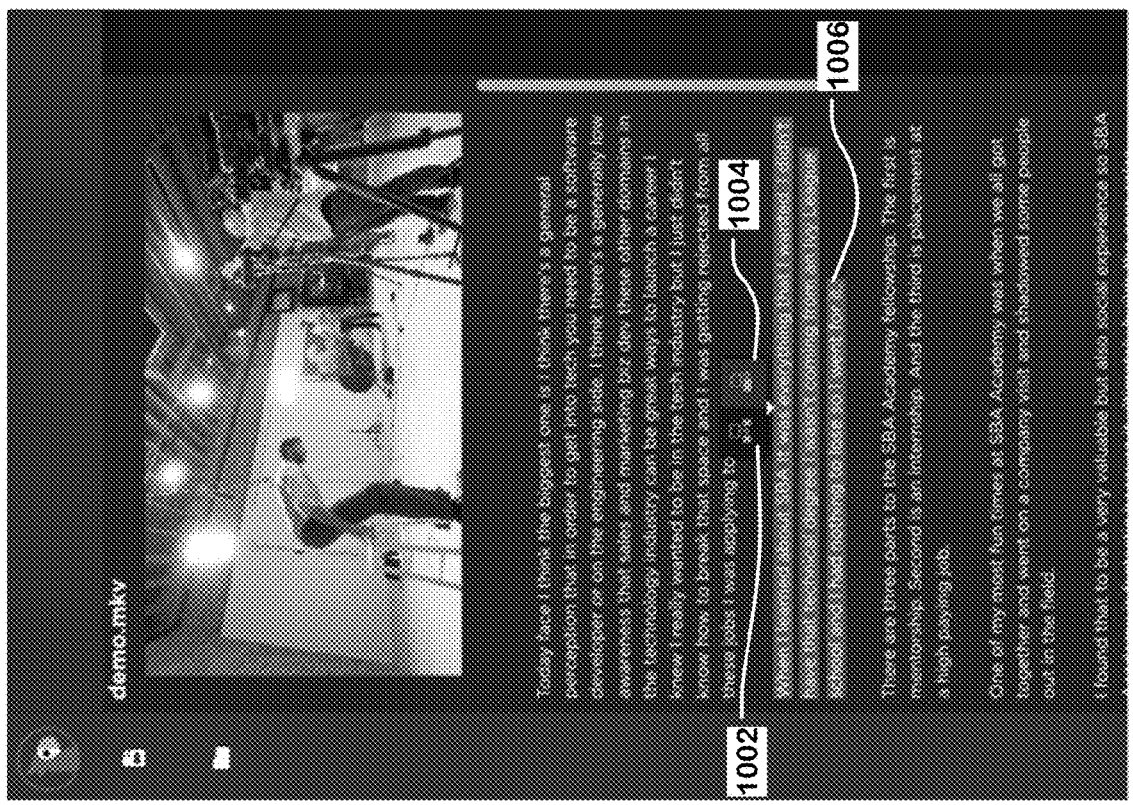
FIG. 10 illustrates the highlighting of text which corresponds to the selected video soundbite.

FIG. 10 illustrates a screenshot of the selection screen for selecting a soundbite to be used in the assembly of the video program 360. A text segment 1006 of the transcript is selected by selecting by highlighting chosen text and choosing a positioning icon 1002 or 1004. These icons cause the selected text segment 508 to be moved to a particular playback position in the video program, which is also the playback position for the corresponding video segment 502. The video segments may be assembled and presented in any order on the video assembly screen, and the video segments may be reordered by selection of an icon 1002 or 1004.

If the user chooses for the text segment and corresponding video segment to be positioned between two previous video segments, the first icon 1002 is selected. If the user chooses for the text segment and corresponding video segment to be positioned at the end of the sequence of video segments, a second icon 1004 is selected. The selected transcribed text segment 1006 is shown highlighted on the text screen.

Figure 11:
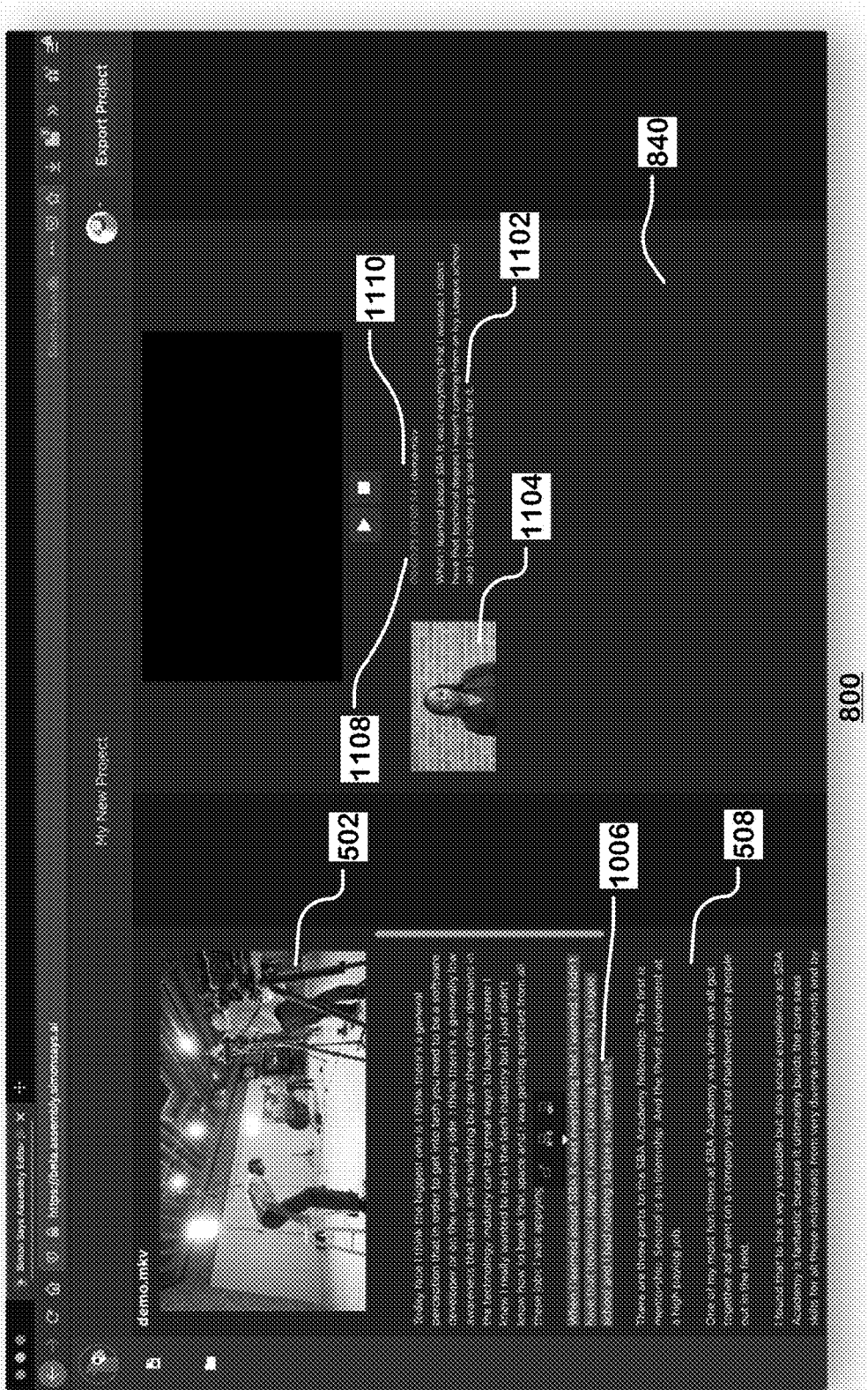
FIG. 11 illustrates the selection of a soundbite after being dragged and dropped onto the timeline window.

Turning now to FIG. 11, a screenshot of the video assembly interface 800 is shown in more detail. The video segment 502 corresponding to a transcribed text 508 is shown. The selected text segment 1006 of the transcript 508 is shown highlighted on the screen. Selected elements from the leftmost panel are moved to the assembly panel 840, or timeline area, by drag-and-drop actions. The ordering and reordering of text and video segments elements are likewise arranged by drag-and-drop actions. The order of presentation on the rightmost panel is again sequenced by dragging and dropping the selected text 1006. In the rightmost panel, a preview frame 1104 is displayed alongside the selected text 1102. The preview frame 1104 is a thumbnail of one frame from the video segment 502, corresponding to the selected text 1006.

The preview frame 1104 is displayed alongside the selected text 1102. The preview frame 1104 is similar to a thumbnail or head frame in video editing, providing a visual representation of the video clip as a guide to sequencing the video segments 502 in the assembly of the video program. It is a convenient way for the editor to reorder the clips by dragging and dropping during program creation. In the rightmost panel of the screen, the project name 1110 is shown alongside the timecode 1108 or timestamp associated with the last text element or video frame for that selection. From this point onward, the user may "click" the preview frame to play the video.

The user interacts with the program by user actions, which may include drag-and-drop actions. Selections of text segments 1006 and the associated video segments 502 are made by user actions, which may include by drag-and-drop actions. The order of the video segments 502 may be arranged and reordered by reordering commands, which may include dragging and dropping of clips. Reordering of clips is performed preferably by drag-and-drop actions, but other user reordering commands are contemplated.

Figures 12A, 12B:
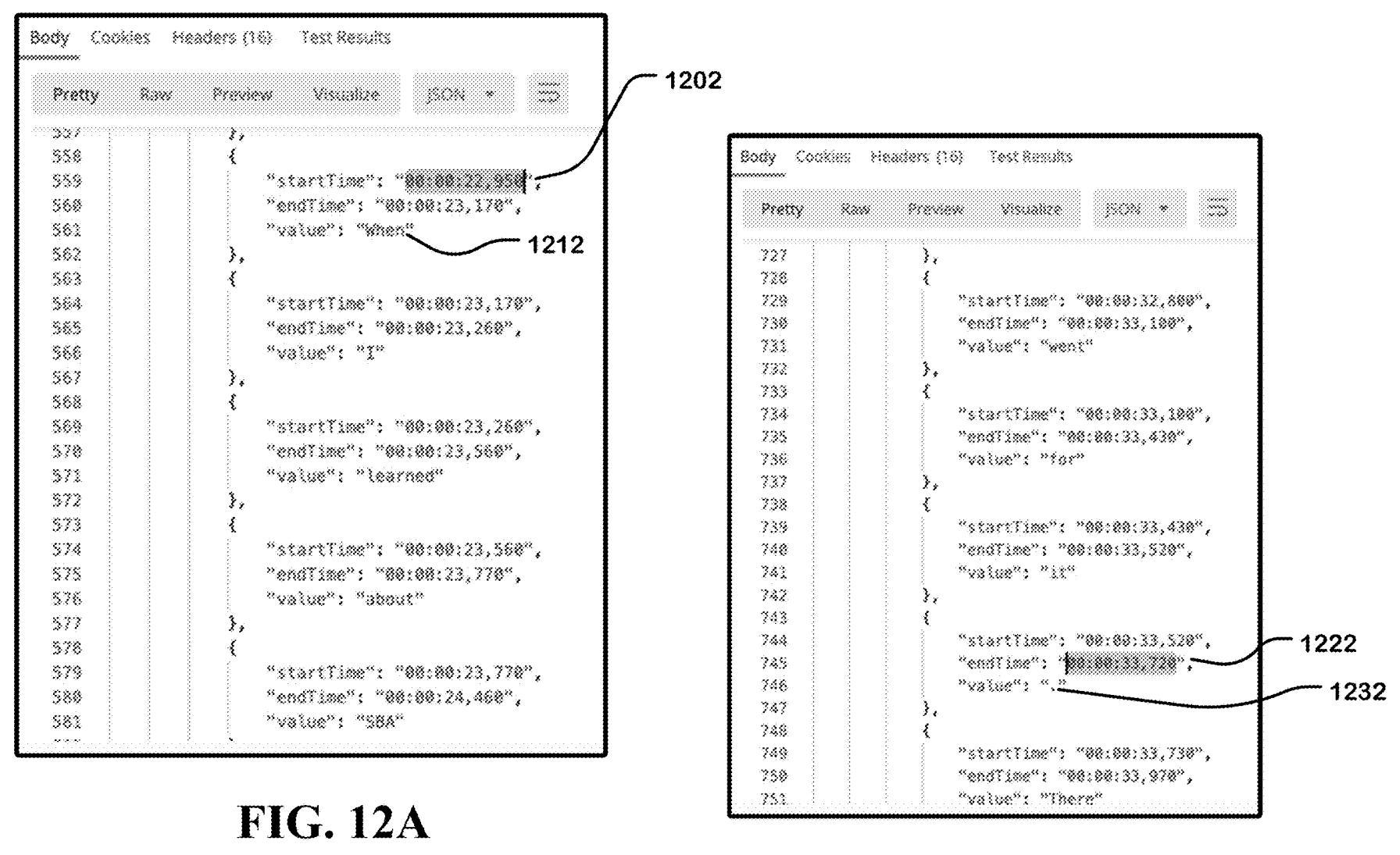

FIG. 12A and FIG. 12B illustrate the timecode tracking for the selected text segment lighted selection 1006 selection shown in FIG. 11. Each selected word or text element is tracked with its associated starting timecode and ending timecode. For example, the text element "When" 1212 is shown with starting timecode 1202, and the text element "." 1232 is shown with the end timecode 1222. Every text elements or word in the selected text segment 1006 are stored with its associated start and end timecode.

Figure 13:
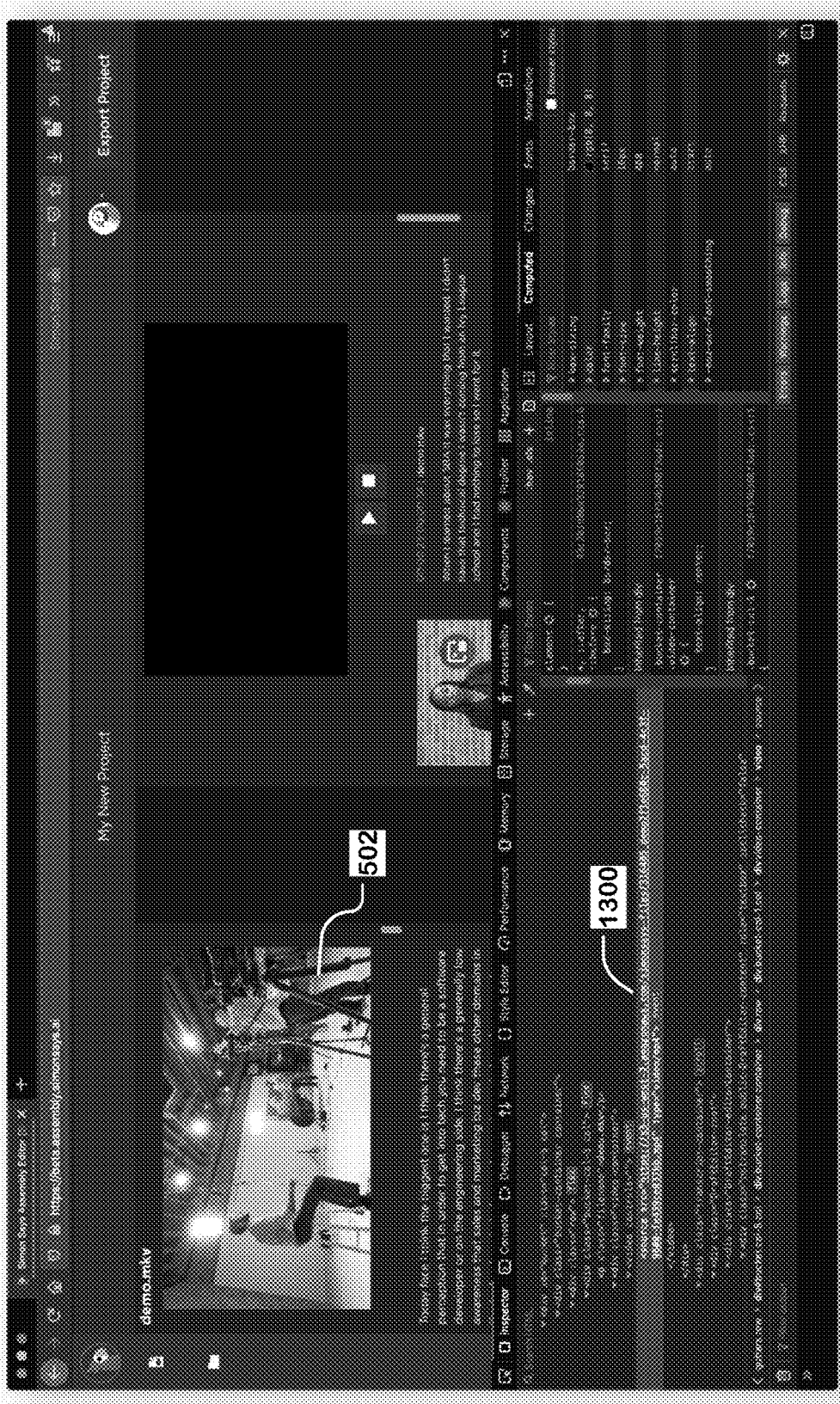
FIG. 13 illustrates a media fragment uniform resource identifier (URI) for the example shown in FIG. 11.
Figure 14:
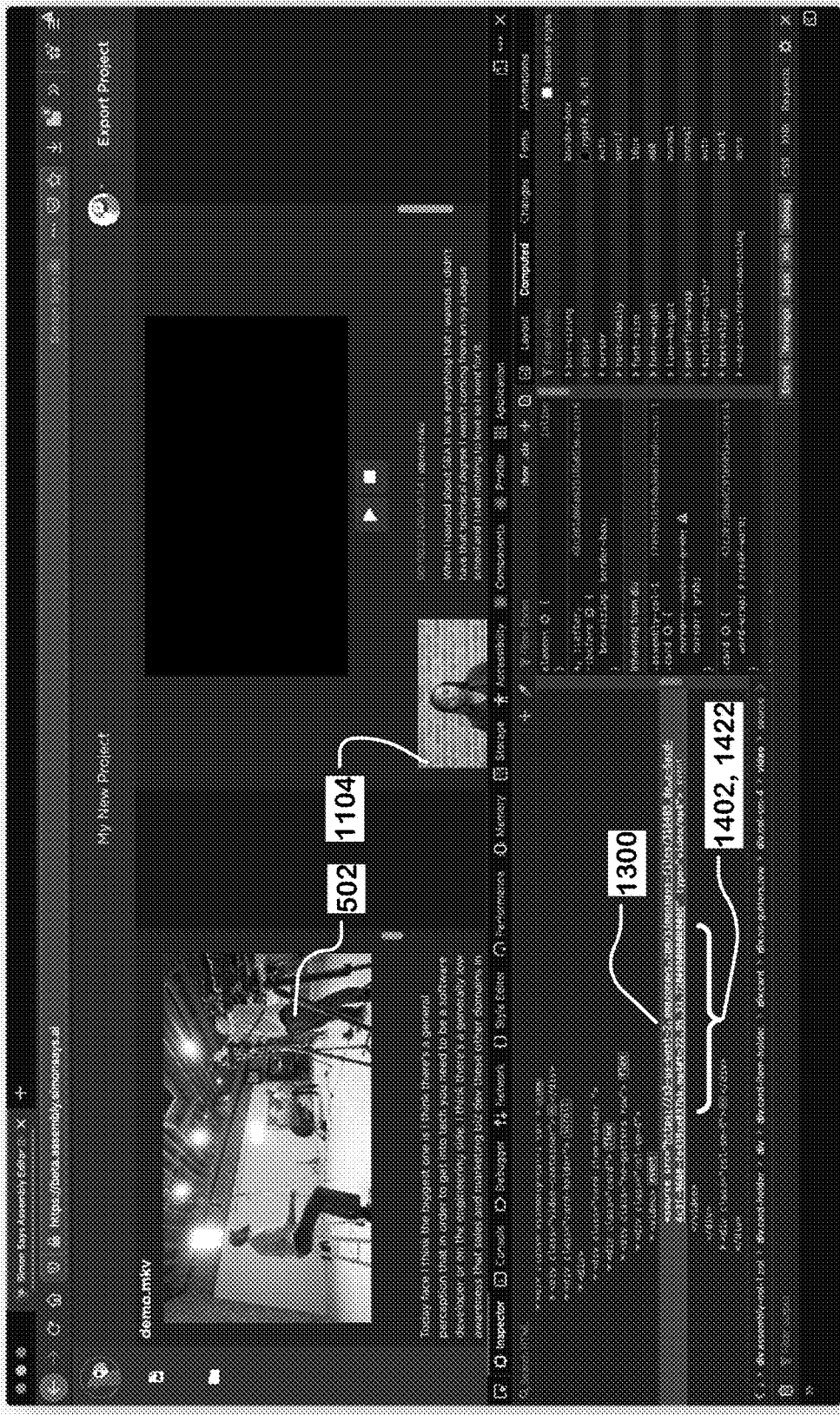
FIG. 14 illustrates the method of accessing a media fragment uniform resource identifier (URI) of the video, using a start timecode of a first text element ("when") in the text segment and an end timecode of a last element in the text segment.

As illustrated in FIG. 13 and FIG. 14, when the user makes a selection of a text segment 1006, the system accesses a media fragment uniform resource identifier (URI) 1300 of the video. The media fragment URI 1300 is generated for the selected video segment and includes metadata associated with the selected video segment. The media fragment URI 1300 of the video segment 1104 identifies the start timecode and the end timecode of the last element. The structure of the universal resource identifier URI 1300 is shown in FIG. 13 and FIG. 14. In particular, in FIG. 14, the start timecode 1402 and the end timecode 1422 is indicated within the media fragment URI 1300.

Figure 15:
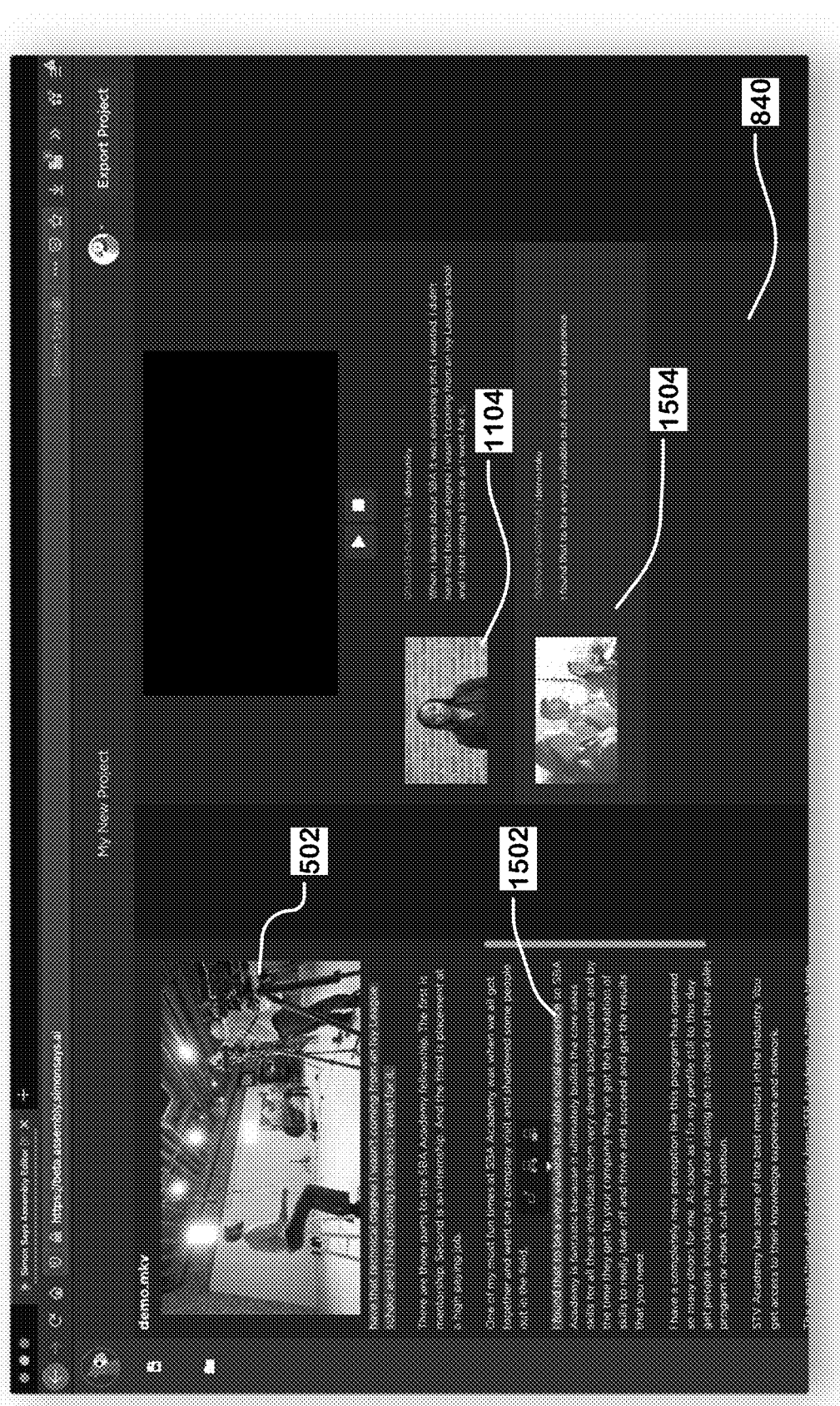
FIG. 15 illustrates the video program assembly method according to the technology disclosed.

FIG. 15 shows the selection and sequencing of multiple video segments corresponding to selected text segments. In FIG. 15, the user selects a second text segment 1502 and moves the text segment into the video assembly editor timeline 840. The first selected video segment 1104 is displayed in the user interface as a preview frame in the topmost location of the editor. The second selected video segment 1504 is positioned below the first segment 1104. The first segment 1104 is configured to play before the second segment. If a third video segment is selected, as defined by start timecode and end timecode, the third segment will be displayed below the first and second segments. A sequence will be generated to play the first, second, and third video segments in the order in which the first, second, and third selections are received.

Figure 16:
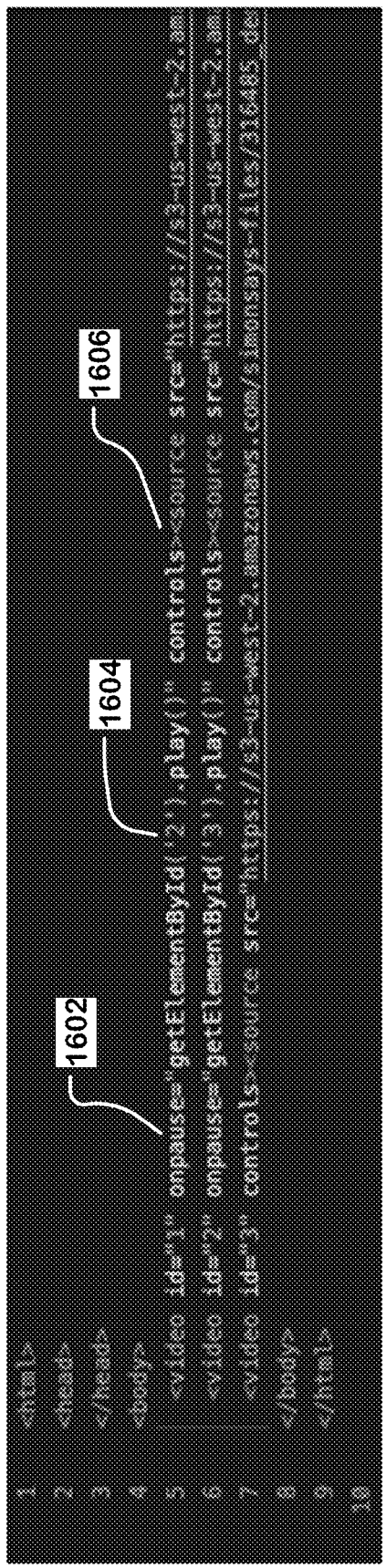
FIG. 16 illustrates the sequencing of video segments in the creation of a video project that includes first, second, and third video segments chained using callback functions.
Figure 17:
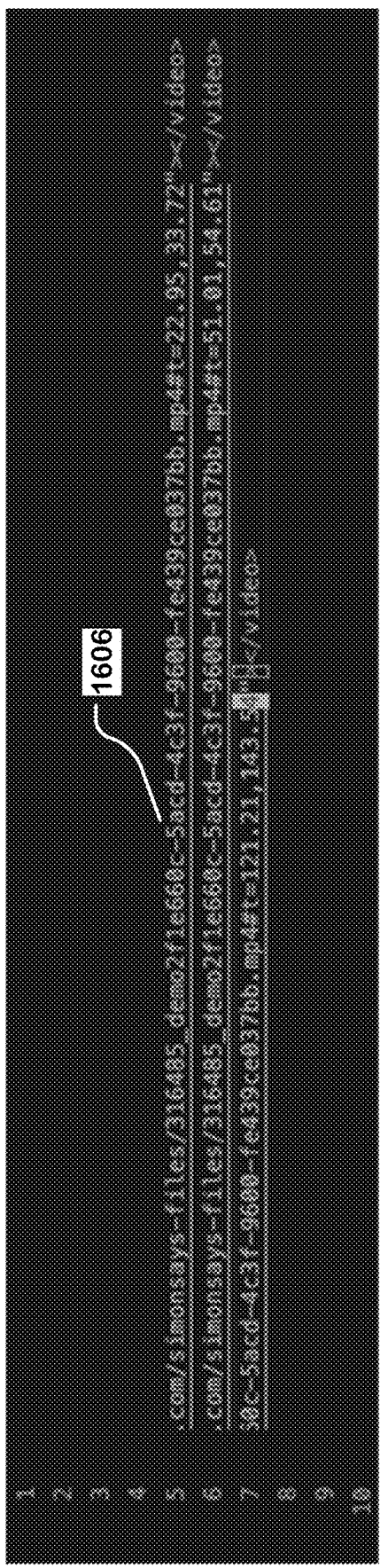
FIG. 17 illustrates another example the creation a project having first, second, and third video segments chained using callback functions.

FIG. 16 shows the callback functions. The callback functions are JavaScript callbacks. The callback functions use Hypertext Markup Language (HTML) to designate on pause events 1602. The callbacks accept video identifiers 1604 that indicate the successive video segments and the order of their playback. The sequence is further configured to play the first, second, and third video segments in a second playback order prescribed by a reorder command 1606, as shown in FIG. 17. Successive video identifiers are updated in response to the reorder command 1606. The reorder command 1606 is a user interface action that graphically reorders the first, second, and third video segments in the sequence across a graphic interface.

Figure 18:
FIG. 18 illustrates the reordering or altering of the playback sequence of video segments having sequence identifiers for playing the first, second, and third video segments in a second order.

FIG. 18 shows that the callbacks 1606 use hypertext markup language (HTML) onpause events and will play the sequence of video segments in response to a play command based on the updated successive video identifiers 1802, 1804. This second play command is based on updated successive video identifiers, which cause playback of the first, second, and third video segments in the second order second, and third video segments in the second order.

Figure 19:
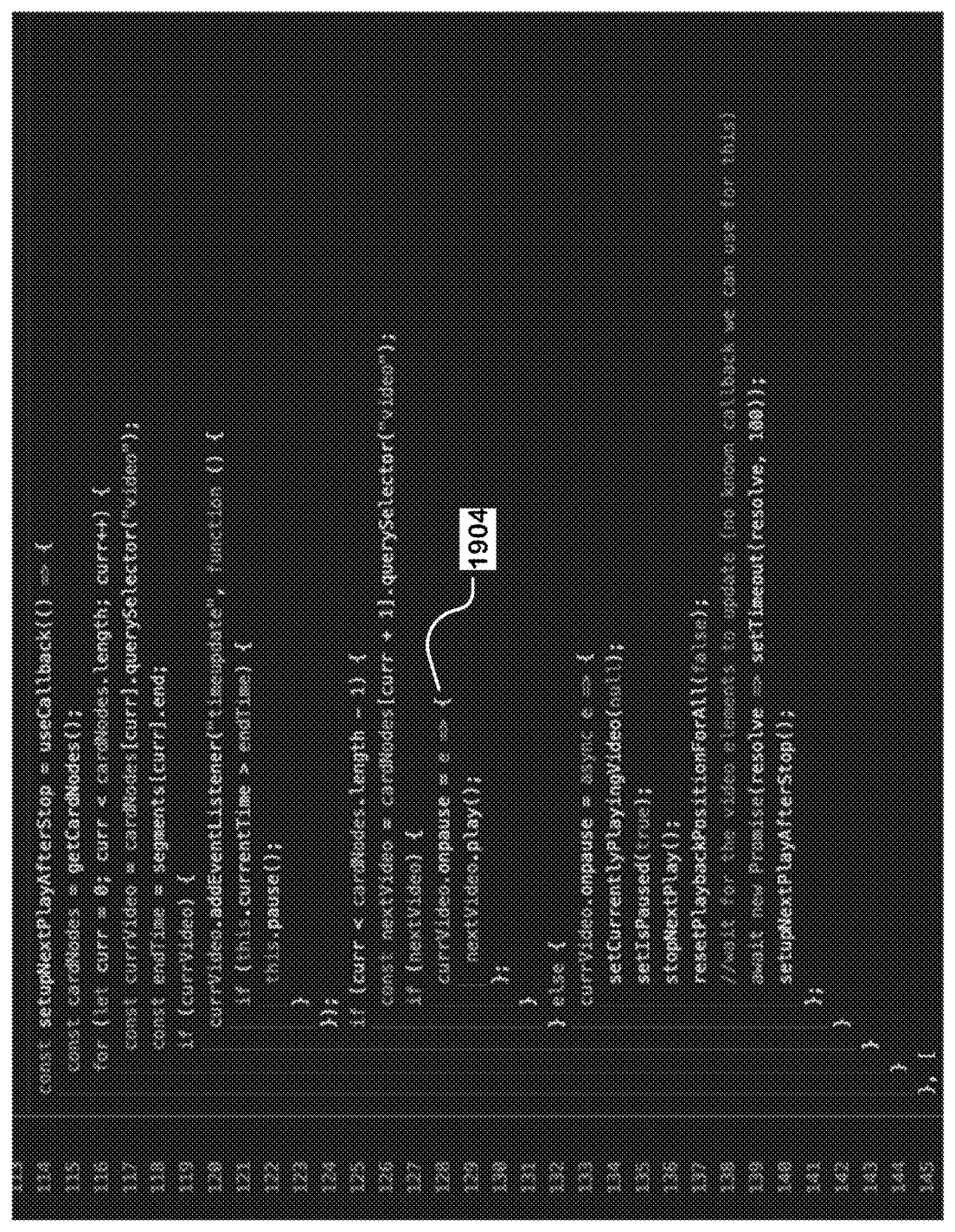

FIG. 19 illustrates that the sequence is further configured to play a successive video segment among the first, second, and third video segments immediately upon completion of playing a current video segment. The sequence is further configured to use callback functions to play the successive video segment immediately upon completion of playing the current video segment 1904. In response to the reorder command, the successive video identifiers are updated, thereby chaining playback of the first, second, and third video segments in the second order.

Figure 20:
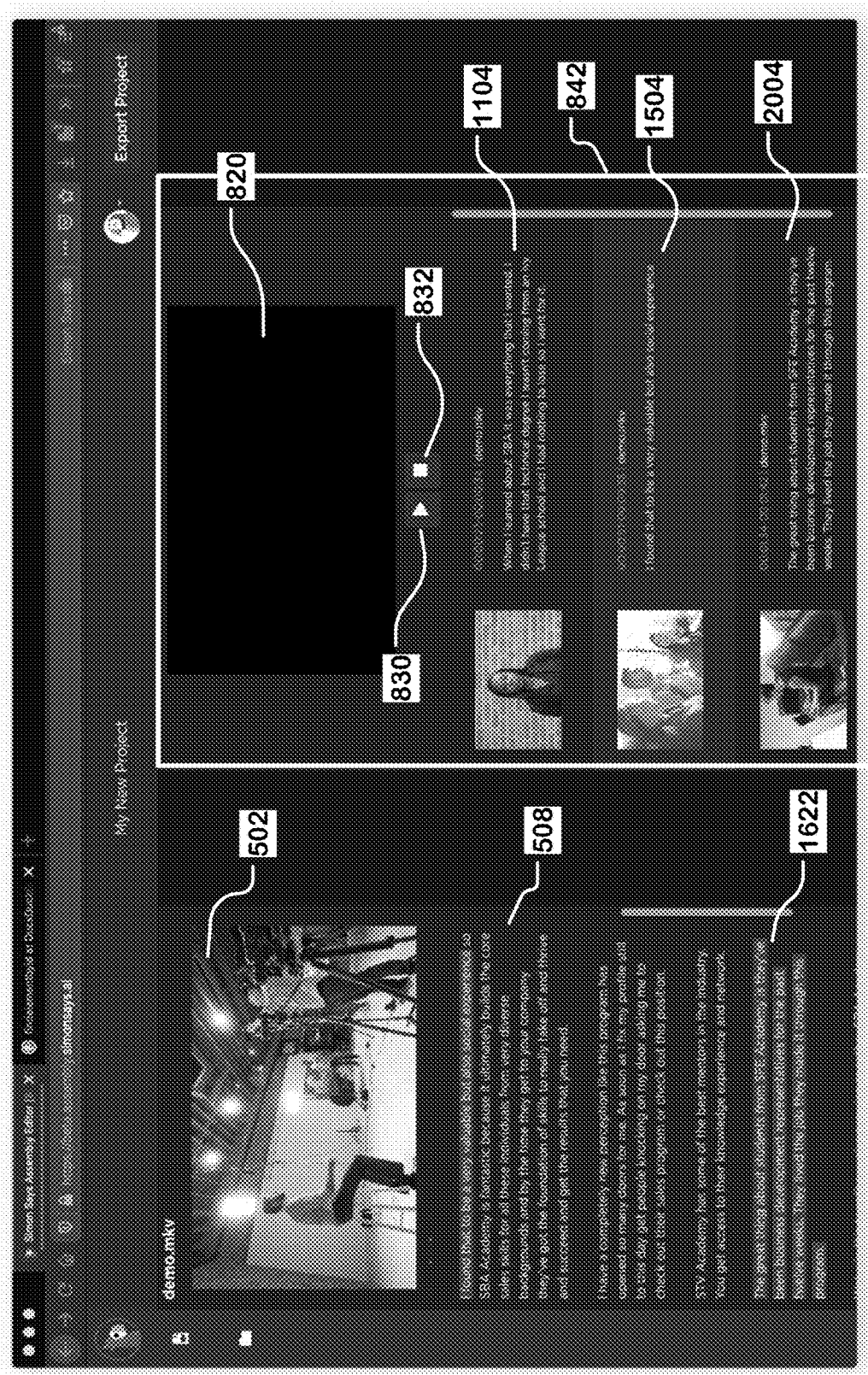
FIG. 20 shows the user function with the timeline completed so that a user can initiate playback the assembled video.
Figure 21:
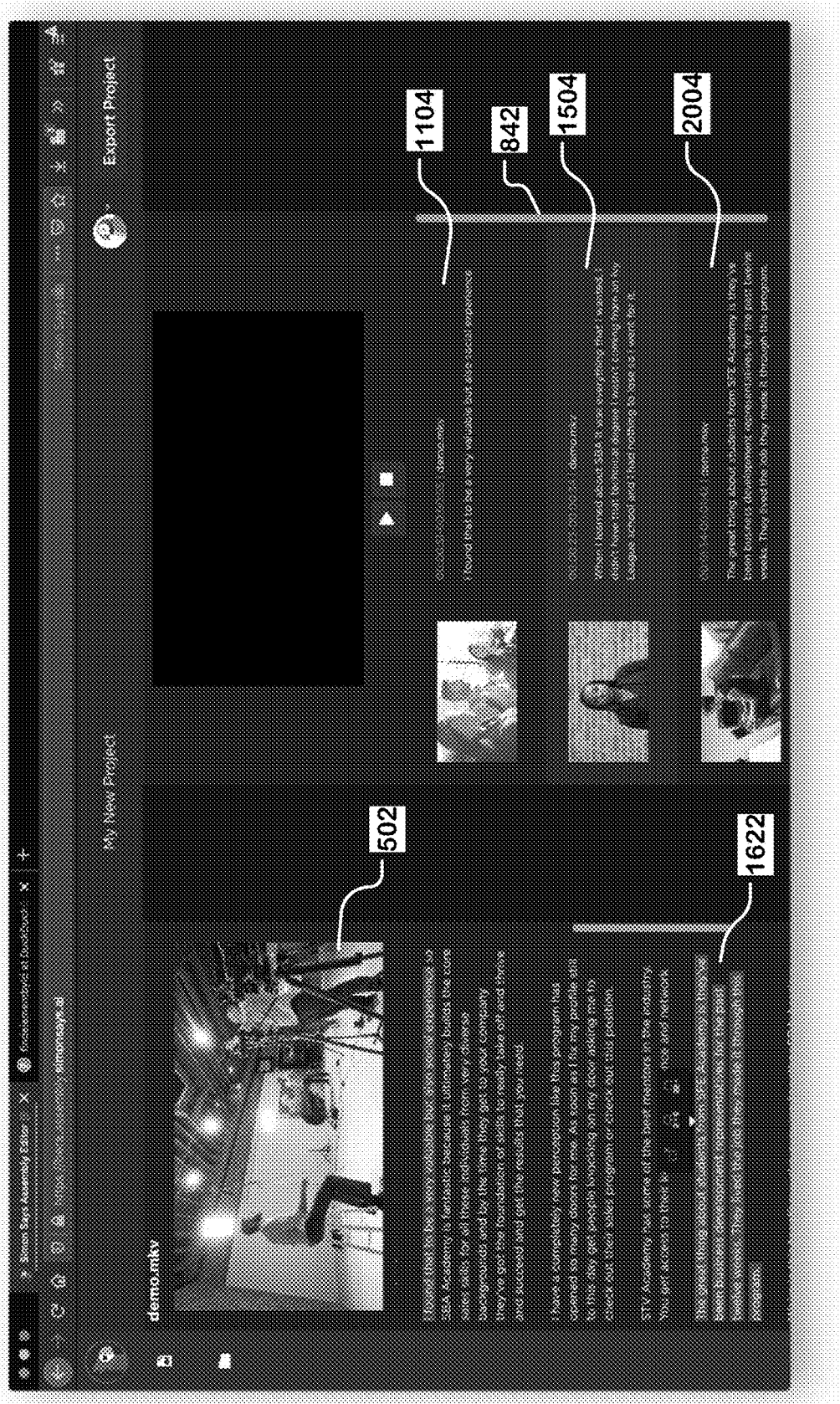
FIG. 21 illustrates the final chosen arrangement of a first, second, and third video segment in the assembled video program, ready for export.

FIG. 20 and FIG. 21 shows the user interface screens for the operational video assembly editor for selecting, sequencing, and playing video clips corresponding to transcribed text. The video player is configured to play a video in a video window 502. The transcript of the audio track 508 is graphically displayed and synchronized with frames of the video clip. The user selects one of a plurality of text segments 1622 in the synchronized transcript 508 by highlighting the selected text in the display. The system is configured to play back the video segment 502 that is synchronized to the selected text segment 1622. The user selects text segments the text, and selected text 1622 is moved onto the video editor timeline 842.

The timeline 842 is configured to play back the successive video segments in order in which the text segments are dropped onto the timeline. The video corresponding to a text segment is displayed, showing the actual text along with the starting and ending timecode of the text segment. A preview frame 1104 is displayed with the selected text segment along with the starting timecode for the video segment.

The playback function on the video player 820 includes a play/resume button 830. The video assembly editor plays the video segments in the order the text segments were selected. The player includes a play/resume button 830, and a pause button 832. The timeline 1650 is configured to, in response to the selection, to graphically render respective previews of the video segments in the order. The timeline 1650 of the video assembly editor is configured to graphically render text in the text segments along with their respective timestamps adjacent to the respective previews adjacent to the respective previews. A second text and video segment 1504 is positioned below the first selected segment 1104, and the third text and video segment 2004 is positioned below the second selected text and video segment 1504. A progress bar may be displayed under the video so that a user may see the playback position within the timeline. Also, the current playback position of collaborators may also be displayed. The user may also skip back and forth between segments, or jump directly to one by clicking on the thumbnail 1104, 1504, and 2004.

Operation of the Disclosed Technology

In creating a new project, the user drags and drops audio and video files, often in the form of MP4 videos by accessing cloud storage applications. The downloaded video clips will include an audio track, video track, and synchronizing timecode for the audio track in the video track. The first step is to transcribe the original audio into a transcription language. In this form, a text file is created which corresponds to the spoken words in the audio track. The timecode associates each spoken word with the spoken words in the audio track. The text transcription is in the original language in the audio track, but there is a provision to convert the text into other languages as a secondary step, as needed and-drop audio.

In the next phase, the video assembly mode, the video is cut by editing text. By selecting and sequencing the text representations of the soundbites from speakers voices, transcribed into text, the corresponding video is also sequenced on a graphical timeline. Once a rough-cut video is created from sequencing the soundbites, other video editing operations are performed, such as removing time gaps, and bloopers, the video can be exported using a variety of export formats such as popular MP4. Subsequently, the rough-cut video can be further processed in a nonlinear video editing application.

In the speaker video resources, multiple speakers can be identified in a single transcript. Each clip can include one or more speakers. Multiple speaker video resources can be created by transcribing zoom meetings and other video conferences.

A video conferencing center can facilitate generation of transcripts by marking in video recording original audio channel sources to help the transcription process distinguish among speakers and to recognize multiple speakers talking at the same time. This is practical during multi-Speaker video conferences, leveraging the separate channel origins of separate speakers. Further, speaker identification can be annotated as captions in the video recording file for speaker channels based on Speaker logins and channel origin attributes.

Removing Bloopers

A blooper may result in a recorded interview or informational video interview, when a speaker states something that is improper, embarrassing, or otherwise inappropriate for the context of the program. It is usually desirable to remove these "bloopers" from the video program. Selected content may be identified as bloopers by providing a listing of keywords to search. The user may excise portions of the recording, both audio and video, by manipulating the words in the transcript based on this keyword search. The solution can be extended by training the transcription system to alert the user to a blooper keyword and the content immediately preceding the blooper keyword, so that the user may choose to delete the inappropriate content.

Removing Disfluencies

Also, the disclosed technology provides for the automatic removal of disfluencies. Breaks or disruptions in the flow of speech are labelled "disfluencies" and these encompass speech hesitations and irregularities such as "uhm's" or pauses caused by stuttering. Disfluencies may be identified by detecting excessive pauses between spoken words, or using a keyword list of known disfluency utterances. Once identified, the software may automatically delete the disfluencies from the transcript. Additionally, disfluencies may be detected by machine learning methods.

Collaboration Mode

The creation of a video program has been and continues to be a collaborative effort. The technology of the present invention provides for the originator of the project to share the project with other collaborators by inviting others to collaborate.

In one aspect, a user may invite others to collaborate and play the rough-cut video program. A collaborator may input security credentials into the application the user-interface, which allows that collaborator authorized status to provide near real-time commentary on a video program under development in the video assembly editor.

Collaborators may view and approve the rough-cut, or make suggestions for alternatives or improvements, and actually create different versions. For example, collaborators may play back different versions to view alternative sequencing of video segments and provide comments or suggested edits the user.

The creation of a video program has been and continues to be a collaborative effort. The technology of the present invention provides for the originator of the project to share the project with other collaborators by inviting others to collaborate. Collaborators may indicate approval or disapproval on the timeline with visual icons (emoji's).

User Interface

In one aspect, the disclosed technology is a method and system for video editing and for assembling a video program implemented a dedicated website. The disclosed technology provides an enhanced user experience (UX) superior to competitive products The workflow is an easy-to-follow guided method for assembling a video program. The disclosed technology provides an enhanced user experience by simplifying the video program creation process which results in a final program that can be exported for post-processing or final processing in a dedicated video editing system.

Various competitive products have the drawback of not being user-friendly. It is known that when the workflow and user experience (UX) is complex, illogical, or non-intuitive, users can be discouraged from using the website at all. Providing the user with a pleasing user experience (UX), promotes further use of the website application. The user interface may support viewing transcripts for two interviews at the same time on multiple monitors to make cutting between subjects faster.

In another aspect, the timeline may be arranged by topics and nested sequences.

Computer System

Figure 22:
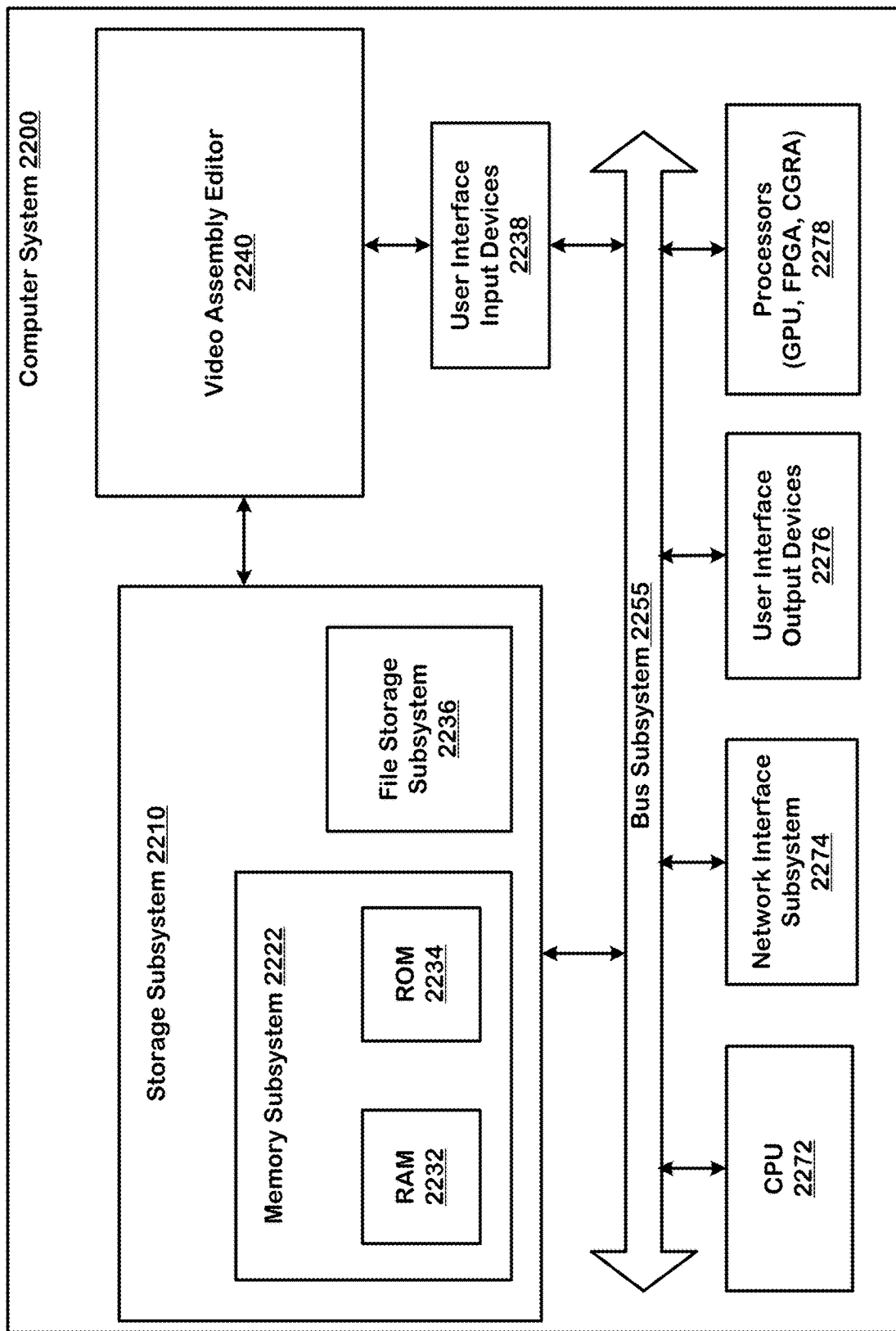
FIG. 22 illustrates in schematic form a computer system that can be used to implement the technology disclosed.

FIG. 22 is a computer system 2200 that can be used to implement the technology disclosed. Computer system 2200 includes at least one central processing unit (CPU) 2272 that communicates with a number of peripheral devices via bus subsystem 2255. These peripheral devices can include a storage subsystem 2210 including, for example, memory devices and a file storage subsystem 2236, user interface input devices 2238, user interface output devices 2276, and a network interface subsystem 2274. The input and output devices allow user interaction with computer system 2200. Network interface subsystem 2274 provides an interface to outside networks, including an interface to corresponding interface devices in other computer systems.

In one implementation, the video assembly editor 2240 is communicably linked to the storage subsystem 2210 and the user interface input devices 2238.

User interface input devices 2238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2200.

User interface output devices 2276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2200 to the user or to another machine or computer system.

Storage subsystem 2210 stores programming and data constructs that provide the functionality of some or all of the modules and methods described herein. These software modules are generally executed by processors 2278.

Processors 2278 can be graphics processing units (GPUs), field-programmable gate arrays (FPGAs), application-specific integrated circuits (ASICs), and/or coarse-grained reconfigurable architectures (CGRAs). Processors 2278 can be hosted by a deep learning cloud platform such as Google Cloud Platform™, Xilinx™, and Cirrascale™. Examples of processors 2278 include Google's Tensor Processing Unit (TPU)™, rackmount solutions like GX4 Rackmount Series™, GX22 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM'S DynamicIQ™, IBM TrueNorth™, Lambda GPU Server with Testa VlOOs™, and others.

Memory subsystem 2222 used in the storage subsystem 2210 can include a number of memories including a main random access memory (RAM) 2232 for storage of instructions and data during program execution and a read only memory (ROM) 2234 in which fixed instructions are stored. A file storage subsystem 2236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2236 in the storage subsystem 2210, or in other machines accessible by the processor.

Bus subsystem 2255 provides a mechanism for letting the various components and subsystems of computer system 2200 communicate with each other as intended. Although bus subsystem 2255 is shown schematically as a single bus, alternative implementations of the bus subsystem can use multiple busses.

Computer system 2200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2200 depicted in FIG. 22 is intended only as a specific example for purposes of illustrating the preferred implementations of the present invention. Many other configurations of computer system 2200 are possible having more or less components than the computer system depicted in FIG. 22.

Each of the processors or modules discussed herein may include an algorithm (e.g., instructions stored on a tangible and/or non-transitory computer readable storage medium) or sub-algorithms to perform particular processes. A module is illustrated conceptually as a collection of modules, but may be implemented utilizing any combination of dedicated hardware boards, DSPs, processors, etc. Alternatively, the module may be implemented utilizing an off-the-shelf PC with a single processor or multiple processors, with the functional operations distributed between the processors. As a further option, the modules described below may be implemented utilizing a hybrid configuration in which certain modular functions are performed utilizing dedicated hardware, while the remaining modular functions are performed utilizing an off-the-shelf PC and the like. The modules also may be implemented as software modules within a processing unit.

Various processes and steps of the methods set forth herein can be carried out using a computer. The computer can include a processor that is part of a detection device, networked with a detection device used to obtain the data that is processed by the computer or separate from the detection device. In some implementations, information (e.g., image data) may be transmitted between components of a system disclosed herein directly or via a computer network. A local area network (LAN) or wide area network (WAN) may be a corporate computing network, including access to the Internet, to which computers and computing devices comprising the system are connected. In one implementation, the LAN conforms to the transmission control protocol/internet protocol (TCP/IP) industry standard. In some instances, the information (e.g., image data) is input to a system disclosed herein via an input device (e.g., disk drive, compact disk player, USB port etc.). In some instances, the information is received by loading the information, e.g., from a storage device such as a disk or flash drive.

A processor that is used to run an algorithm or other process set forth herein may comprise a microprocessor. The microprocessor may be any conventional general purpose single- or multi-chip microprocessor such as a Pentium™ processor made by Intel Corporation. A particularly useful computer can utilize an Intel Ivybridge dual-12 core processor, LSI raid controller, having 128 GB of RAM, and 2 TB solid state disk drive. In addition, the processor may comprise any conventional special purpose processor such as a digital signal processor or a graphics processor. The processor typically has conventional address lines, conventional data lines, and one or more conventional control lines.

The technology disclosed herein may be implemented as a method, apparatus, system or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices. In particular implementations, information or algorithms set forth herein are present in non-transient storage media.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

One or more implementations of the technology disclosed, or elements thereof can be implemented in the form of a computer product including a non-transitory computer readable storage medium with computer usable program code for performing the method steps indicated. Furthermore, one or more implementations of the technology disclosed, or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Particular Implementations

Some particular implementations and features for assembling a video program using soundbite-based editing are described in the following discussion. The disclosed technology is a time-saving way to produce a rough cut video using an intuitive user interface that requires no special training or tutorials for its use. In one disclosed implementation, the system and a computer implemented method are provided for assembling and editing of video program is based on spoken words and soundbites. The disclosed technology imports source A/V files over network and provides the user with a way as assembling and editing a video program from spoken words associated with the imported video files. The past nonlinear video editing has been performing complex and expensive dedicated machines with dedicated software. The disclosed technology brings video editing and the assembly of the video program within the grasp of most Internet users from remote locations using cloud-based applications or a network.

Video files generally consist of an audio track and a video track. This audio track and video track are synchronized by timecodes so that each frame of video is locked into frame of audio. In actuality, the audio track in the video track are synchronized. One frame of audio is associated by timecode to one frame of video. Video clip also contains other metadata of various kinds including frame rate, image resolution, along with the synchronizing timecode. Source audio/video clips may be imported in various formats such as popular format such as MPEG 4. The disclosed technology imports source audio/video clips and any of the popular video formats.

In one aspect, a video track including spoken audio with spoken voices is transcribed into searchable text by a speech-to-text engine. The text transcript appears as an editable text document. In the transcription process a timecode is associated with each transcribed word from the audio track. The words are mapped to the video, and every spoken word has an associated timecode, with a start timecode and a stop timecode. Each word of transcribed text has a corresponding start timecode and end timecode. Each spoken word corresponds to a timecode marker, which in turn corresponds to a video frame or frames.

In one implementation, the transcribed text may be edited using conventional word processing operations and text editing functions. The text may be or searched by the use of keywords. By searching the corresponding text, exact fragments or soundbites can be identified in the transcribed text and selected as transcribed text segments. By selecting text and arranging text segments on a timeline display, a video program can be assembled on a timeline display. The video frames in the selected video segments correspond precisely to selected text segments. Multiple text segments may be selected by the user and move to the timeline by drag-and-drop actions, and sequenced as a playlist. In this way, a video program is assembled which can be played back, while the user experiments until satisfied with the final sequence which can then be exported as a complete program or as a rough cut video program which can be exported to a dedicated nonlinear editing system or application for fine cut finishing. The disclosed technology can be used to assemble a video program on a timeline display in any chosen order by the user. The sequence of video segments may be ordered, reordered, and edited, as desired. Sequences can be changed along within the video segments themselves, until the user is fully satisfied with the composition of the video program, and the user is ready to export.

In the assembly of a video program, the disclosed technology allows the user to engage authorize collaborators to view the video project as it is being assembled. Authorized collaborators can log on and play the video, provide comments on the project, provide suggestions for alternatives for improvements, or simply provide positive indicators in the form of emoji's.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In another aspect, the present invention provides a very fast way to search for relevant content. The alternative is to view an entire video and audio track, which can be time-consuming, even when viewed at faster than real-time speed. By using transcribed text which can be searched, locating relevant text is expedited. It's no longer necessary to view the entire video or listen to the entire audio associated with the transcribed text to find relevant content. When the user highlights text in the transcription, the audio and video corresponding to that text is immediately queued up for viewing. This feature also expedites the assembly of the video program, because the user can quickly identify the particular soundbites which are essential to assembling a particular video program.

In one aspect of the disclosed technology, a video implemented method is provided for assembling an audio/video program from source A/V files. The method includes importing at least one source audio/video file, where the audio/video file comprising an audio track and a video track. The audio track includes audio frames and the video track including video frames synchronized by time code. The audio track further includes spoken speech from one or more speaker's voices, which are in synchronization with the corresponding video frames. The method includes creating a text transcription of the spoken speech using a speech-to-text engine. During the creation of the text transcription, each word in the audio track is mapped to corresponding video frames. On a monitor screen, the transcription of the audio is displayed as text in a text window, alongside an indication of the corresponding video frames. The present technology maps the text elements to the corresponding video frames in the transcript map, where each word has a start timecode and end timecode. A user interacts through a user interface to select a text segment and moving the selected text segment with the corresponding video segment into a visual timeline on the monitor screen. The text segment and corresponding video segment are displayed together on visual timeline.

The disclosed technology tracks spoken content for multiple speakers, and the content is automatically labeled for each speaker based on the speech characteristics of each speaker. In one aspect, the spoken content is labeled with speakers' names. In another aspect, the identification label for each speaker is manually applied by the user. Users may assign a speaker identification label to selected text, and it will propagate to all other paragraphs that are determined by the software to be the same speaker.

In one aspect, the computer implemented method provides a timeline for displaying the selected video clips arranged in a chosen display sequence. In some implementations of the method for assembling a video program, multiple text segments and corresponding video segments are moved to the visual timeline and displayed in a user-selected playback order on the timeline. In one example, three or more text and video segments may comprise the assembled video program. In another example of the disclosed method, in response to a play command, the selected segments may be played in order of selection as shown the sequence as indicated on the timeline. Alternatively, in response to a user selection, the sequence of playback may be reordered in a second selected order for playback. And in a like manner, in response to user selection, the playback of the selected video segments on the timeline for playback in a third selected order. The reorder command allows the user to drag-and-drop the text and video selections into a different chosen order. A user may skip forwards or backwards, clicking on chosen thumbnails to jump to that point in the playback, 1104, 1504, or 2004.

In one aspect, the user may authorize remote collaborators to play the video program and comment in real time or provide feedback the user. The collaborators must be authorized by using passwords and other network security measures. In another implementation of the disclosed technology, it may be desirable to eliminate some video content in the situation where the speakers use an appropriate language for unwanted content. By performing a keyword search on the transcribed text, the unwanted content may be located and deleted from the assembled. List of keywords can also be applied throughout the transcribed text to identify all instances of unwanted content. By deleting unwanted text content, the corresponding video segments will also be deleted.

In another disclosed implementation, video frames are retrieved corresponding to text selections and the retrieved text and video selections are moved to a timeline display for further editing and assembly of the video program. A completely assembled video program may take the form of a rough-cut video, which will be exported to a secondary video editing system for fine-cut processing.

The disclosed technology may be implemented as a system for assembling a audio/video program. The system includes an A/V storage bin for storing uploaded video files from a user. The video files comprise an audio track and a video track. The audio track includes audio frames and the video track includes video frames synchronized by time code. The audio track further including spoken speech from one or more speakers, in synchronization with corresponding video frames. A speech-to-text engine is provided for creating a text transcription of the spoken speech on the audio track, wherein each transcribed word is mapped to corresponding video frames. Aa monitor screen displays the text transcription. User-selected text segments and corresponding video segments are shown. A visual timeline displayed on the monitor screen for sequencing user-selected text segments and corresponding video segments into a user-selected playback order on the timeline.

Some disclosed implementations provide for refining the playback order of user selected text segments and corresponding video segments are carried out by a user's drag-and-drop actions. The system provides for accepting authorized collaborator interaction with the video program, including playback, providing suggestions, and comments. The collaborators changes may be reflected in the timeline in real-time.

In one implementation, a system is provided for creating and assembling a video program over a network. A host computer is in operable connection with a network interface. The network interface is in operable connection with a network. An application server is in operable communication with the network interface. An application server is configured to host a website application for assembling a video program, the server having a user interface for providing a remote user with web-page access to the host computer. The user interface is in operable communication with an A/V storage bin and video editing resources. The user interface comprises a webpage screen for assembling video program. The user interface comprises a webpage screen configured for uploading a user's A/V files into the application. The user interface further comprises a webpage screen configured for displaying a text window for transcribed text from the audio track of selected A/V files, where the displayed text words correspond to timecode-synchronized video content. A webpage screen is configured to provide a timeline, wherein a user may select text segments and video segments corresponding to the transcribed text segments. A webpage screen is configured to show the sequence of selected text segments alongside corresponding video segments in a vertical timeline configuration. A sequence of text segments and corresponding video segments are listed on a timeline display in a chosen playback sequence. The sequence may be reordered by user drag-and-drop actions.

In a further aspect of the disclosed system, a text window is provided for displaying transcribed text from an audio track, and a video window for displaying image frames corresponding to transcribed text, and a timeline for dropping and dragging transcribed text segments onto the timeline in a user-chosen playback sequence. The timeline displays selected test segments, video preview frames, and a video playback window, wherein the again selected text segments are moved by drag-and-drop actions into a user selected sequence, so that the assembled video program may be played in the selected sequence.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

What is claimed is:

1. A computer-implemented method comprising:
   receiving a selection of a first digital video within a video assembly interface comprising a transcribed text window and a video timeline;
   receiving a selection that highlights one or more words from a transcription of the first digital video within the transcribed text window;
   detecting a drag and drop of the highlighted one or more words from the transcribed text window to the video timeline;
   generating, in response to the drag and drop and within the video timeline, a first video clip from the first digital video corresponding to the highlighted one or more words; and
   displaying, within the video timeline, a video frame thumbnail preview of the first video clip adjacent to the highlighted one or more words.

2. The computer-implemented method of claim 1, wherein receiving the selection that highlights one or more words from the transcription comprises receiving a press and slide selection, on a touch screen display of a client computing device, that highlights the one or more words.

3. The computer-implemented method of claim 1, wherein generating the first video clip from the first digital video corresponding to the highlighted one or more words comprises:
   determining a start time code in the first digital video corresponding to a first word in the highlighted one or more words;
   determining an end time code in the first digital video corresponding to a last word in the highlighted one or more words; and
   generating the first video clip comprising video frames from the first digital video between the start time code and the end time code.

4. The computer-implemented method of claim 3, wherein displaying the video frame thumbnail preview of the first video clip comprises displaying a first video frame from the first video clip as the video frame thumbnail preview.

5. The computer-implemented method of claim 1, further comprising:
   receiving a selection that highlights additional words from the transcription of the first digital video within the transcribed text window;
   detecting a drag and drop of the highlighted additional words from the transcribed text window to the video timeline;
   generating a second video clip from the first digital video corresponding to the highlighted additional words; and
   displaying, within the video timeline and following the first video clip, a video frame thumbnail preview of the second video clip adjacent to the highlighted additional words.

6. The computer-implemented method of claim 5, wherein the video assembly interface further comprises a video window adjacent to the video timeline for playback of video clips according to an order indicated by the video timeline.

7. The computer-implemented method of claim 6, further comprising:
   detecting a drag and drop within the video timeline that reorders the first video clip and the second video clip; and
   playing, in response to a detected selection of the video window, the second video clip followed by the first video clip within the video window.

8. The computer-implemented method of claim 7, further comprising:
   receiving a selection of a second digital video within the video assembly interface;
   receiving a selection that highlights words from a transcription of the second digital video within the transcribed text window;
   detecting a drag and drop of the highlighted words from the transcribed text window to the video timeline;
   generating, a third video clip from the second digital video corresponding to the highlighted words; and
   displaying, in a third position within the video timeline following the second video clip and the first video clip, a video frame thumbnail preview of the third video clip adjacent to the highlighted words.

9. A system comprising:
   at least one physical processor; and
   physical memory comprising computer-executable instructions that, when executed by the at least one physical processor, cause the at least one physical processor to perform acts comprising:

receiving a selection of a first digital video within a video assembly interface comprising a transcribed text window and a video timeline;

receiving a selection that highlights one or more words from a transcription of the first digital video within the transcribed text window;

detecting a drag and drop of the highlighted one or more words from the transcribed text window to the video timeline;

generating, in response to the drag and drop and within the video timeline, a first video clip from the first digital video corresponding to the highlighted one or more words; and displaying, within the video timeline, a video frame thumbnail preview of the first video clip adjacent to the highlighted one or more words.

10. The system of claim 9, wherein receiving the selection that highlights one or more words from the transcription comprises receiving a press and slide selection, on a touch screen display of a client computing device, that highlights the one or more words.

11. The system of claim 9, wherein generating the first video clip from the first digital video corresponding to the highlighted one or more words comprises:

determining a start time code in the first digital video corresponding to a first word in the highlighted one or more words;

determining an end time code in the first digital video corresponding to a last word in the highlighted one or more words; and generating the first video clip comprising video frames from the first digital video between the start time code and the end time code.

12. The system of claim 11, wherein displaying the video frame thumbnail preview of the first video clip comprises displaying a first video frame from the first video clip as the video frame thumbnail preview.

13. The system of claim 9, further comprising computer-executable instructions that, when executed by the at least one physical processor, cause the at least one physical processor to perform acts comprising:

receiving a selection that highlights additional words from the transcription of the first digital video within the transcribed text window;

detecting a drag and drop of the highlighted additional words from the transcribed text window to the video timeline;

generating a second video clip from the first digital video corresponding to the highlighted additional words; and displaying, within the video timeline and following the first video clip, a video frame thumbnail preview of the second video clip adjacent to the highlighted additional words.

14. The system of claim 13, wherein the video assembly interface further comprises a video window adjacent to the video timeline for playback of video clips according to an order indicated by the video timeline.

15. The system of claim 14, further comprising computer-executable instructions that, when executed by the at least one physical processor, cause the at least one physical processor to perform acts comprising:

detecting a drag and drop within the video timeline that reorders the first video clip and the second video clip; and playing, in response to a detected selection of the video window, the second video clip followed by the first video clip within the video window.

16. The system of claim 15, further comprising computer-executable instructions that, when executed by the at least one physical processor, cause the at least one physical processor to perform acts comprising:

receiving a selection of a second digital video within the video assembly interface;

receiving a selection that highlights words from a transcription of the second digital video within the transcribed text window;

detecting a drag and drop of the highlighted words from the transcribed text window to the video timeline;

generating, a third video clip from the second digital video corresponding to the highlighted words; and displaying, in a third position within the video timeline following the second video clip and the first video clip, a video frame thumbnail preview of the third video clip adjacent to the highlighted words.

17. A non-transitory computer-readable medium comprising one or more computer-executable instructions that, when executed by at least one processor of a computing device, cause the computing device to:

receive a selection of a first digital video within a video assembly interface comprising a transcribed text window and a video timeline;

receive a selection that highlights one or more words from a transcription of the first digital video within the transcribed text window;

detect a drag and drop of the highlighted one or more words from the transcribed text window to the video timeline;

generate, in response to the drag and drop and within the video timeline, a first video clip from the first digital video corresponding to the highlighted one or more words; and display, within the video timeline, a video frame thumbnail preview of the first video clip adjacent to the highlighted one or more words.

18. The non-transitory computer-readable medium of claim 17, comprising one or more computer-executable instructions that, when executed by the at least one processor of a computing device, cause the computing device to:

receive a selection that highlights additional words from the transcription of the first digital video within the transcribed text window;

detect a drag and drop of the highlighted additional words from the transcribed text window to the video timeline;

generate a second video clip from the first digital video corresponding to the highlighted additional words; and display, within the video timeline and following the first video clip, a video frame thumbnail preview of the second video clip adjacent to the highlighted additional words.

19. The non-transitory computer-readable medium of claim 18, wherein the video assembly interface further comprises a video window adjacent to the video timeline for playback of video clips according to an order indicated by the video timeline.

20. The non-transitory computer-readable medium of claim 19, comprising one or more computer-executable instructions that, when executed by the at least one processor of a computing device, cause the computing device to:

detecting a drag and drop within the video timeline that reorders the first video clip and the second video clip; and playing, in response to a detected selection of the video window, the second video clip followed by the first video clip within the video window.

\* \* \* \* \*